US005817944A

United States Patent [19]
Chung

[11] Patent Number: 5,817,944
[45] Date of Patent: Oct. 6, 1998

[54] COMPOSITE MATERIAL STRAIN/STRESS SENSOR

[75] Inventor: Deborah D. L. Chung, E. Amhurst, N.Y.

[73] Assignees: The Research Foundation of State University of New York; State University of New York at Buffalo, both of Amherst, N.Y.

[21] Appl. No.: 819,919

[22] Filed: Mar. 18, 1997

Related U.S. Application Data

[60] Provisional application No. 60/013,672 Mar. 19, 1996.
[51] Int. Cl.$^6$ .............................. G01B 7/16; G01L 1/00
[52] U.S. Cl. ................................ 73/768; 73/774; 73/763
[58] Field of Search ............................. 73/768, 763, 774, 73/769, 788

[56] References Cited

U.S. PATENT DOCUMENTS

| | | | |
|---|---|---|---|
| 3,395,564 | 8/1968 | Rastrelli et al. | 73/768 |
| 3,956,926 | 5/1976 | Phillips . | |
| 4,303,355 | 12/1981 | Vilcinskas . | |
| 4,377,800 | 3/1983 | Fuld et al. . | |
| 4,849,668 | 7/1989 | Crawley et al. . | |
| 4,962,668 | 10/1990 | Preston et al. . | |
| 5,006,423 | 4/1991 | Draskovich . | |
| 5,346,547 | 9/1994 | McCormack | 106/644 |
| 5,377,548 | 1/1995 | Ballivy | 73/768 |
| 5,379,644 | 1/1995 | Yanagida et al. | 73/768 |
| 5,422,174 | 6/1995 | Shintani et al. | 428/320.2 |
| 5,581,039 | 12/1996 | Yasutomi et al. | 73/768 |

FOREIGN PATENT DOCUMENTS

| | | | |
|---|---|---|---|
| 1177692 | 9/1985 | U.S.S.R. | 73/768 |

OTHER PUBLICATIONS

"Carbon Fiber Reinforced Cement Composites Improved By Using Chemical Agents" by Qijun Zheng & D. D. L. Chung, Cement and Concrete Rsearch, vol. 19 pp. 25–41, 1989.

"Electromagnetic Interference Shielding By Carbon Fibre Reinforced Cement", by Jeng–Mawchiou, Qijun Zheng, & D. D. L. Chung, Composites, vol. 20, No. 4, Jul. 1989, pp. 379–381.

"Carbon Fibre–Cement Adhesion in Carbon Fibre Reinforced Cement Composites", B. K. Larson, L. T. Drzal & P. Sorousian, Composites vol. 21 No. 3, May 1990—pp. 205–215.

"Latex–Modified Cement Mortar Reinforced By Short Carbon Fibres", by Xiaoming Yang & D. D. L. Chung, Composites vol. 23, No. 6, Nov. 1992, pp. 453–460.

"Carbon Fibre Reinforced Concrete for Smart Structures Capable of Non–Destructive Flaw Detection", by Pu–Woei Chen & D. D. L. Chung, Smart Mater. Struct. 2 1993, pp. 22–30.

"Concrete Reinforced with up to 0.2 vol. % of Short Carbon Fibres", By Pu–Woei Chen and D. D. L. Chung, Composites, vol. 24, No. 1, 1993, pp. 33–52.

"Strain Sensors Based on the Electrical Resistance Change Accompanying the Reversible Pull–out of Conducting Short Fibers in a Less Conducting Matrix." by D. D. L. Chung, Smart Mater. Struct 4, 1995, pp. 59–61.

(List continued on next page.)

*Primary Examiner*—Max H. Noori
*Attorney, Agent, or Firm*—Eugene Stephens & Associates

[57] ABSTRACT

A new strain/stress sensor based on the concept of reversible crack opening in a composite material. Crack opening increases the electrical resistance, which is the signal provided by the sensor. The new technology is manifested in concrete and mortar containing electrically conducting short fibers (e.g., carbon fibers and steel fibers). Carbon fibers serve to greatly decrease the crack height so that apparently reversible crack opening occurs. The crack opening is accompanied by fiber pull-out, resulting in fiber-matrix contact resistivity increase, thus allowing sensing under cyclic as well as static loading. A part of the resistance change is irreversible, so it provides memory of the first deformation.

29 Claims, 9 Drawing Sheets

OTHER PUBLICATIONS

"Improving the Bonding Between Old and New Concrete By Adding Carbon Fibers to the New Concrete" by Pu–Woei Chen, Xuli Fu, and D. D. L. Chung, Cement and Concrete Research, vol. 25, No. 3, pp. 491–496, 1995.

"Carbon Fiber Reinforced Concrete as an Intrinsically Smart Concrete for Damage Assessment During Dynamic Loading" by Pu–Woei Chen and D. D. L. Chung, Mat. Res. Soc. Symp. Proc. vol. 360, 1995, pp. 317–322.

"Concrete as a New Strain/Stress Sensor", Pu–Woei Chen and D. D. L. Chung, Composites Part B, vol. 27 B No. 1, 1996 pp. 11–23.

"Carbon Fiber Reinforced Concrete as an Intrinsically Smart Concrete for Damage Assessment During Static and Dynamic Loading" by Pu–Woei Chen and D. D. L. Chung, ACI Materials Journal/Jul.–Aug. 1996, pp. 341–350.

COMPOSITE MATERIAL STRAIN/STRESS SENSOR

This application claims the benefit of U.S. Provisional application Ser. No. 60/013,672, filed on 19 Mar. 1996, which provisonal application is incorporated by reference herein.

BACKGROUND OF THE INVENTION

1. Field of the Invention

The invention pertains to strain/stress sensing in structures made from composite materials. In particular, the invention relates to the monitoring of strain and stress in structures made from composite materials such as mortar and concrete. Monitoring of this sort is typically done using surface-mounted strain gages or sensors embedded in the structure. The use of strain gages suffers from the disadvantage of the relative delicacy of the strain gages and the exposure of the components to the elements. The use of embedded sensors suffers from the disadvantage of the weakening of the structure. due to the presence of the sensor and a related cavity.

2. Description of Related Art

There is an ever present need to detect damage to structures and effect repairs before the structures are beyond repair. However, the typical methods of such flaw detection suffer from disadvantages as discussed above. Thus, there is a need for non-destructive flaw detection or in-situ monitoring of structural integrity. Some types of structures that can benefit from nondestructive flaw detection are highways, bridges, and nuclear power plants, especially structures of these types in earthquake prone regions.

A strain/stress sensor has the ability to provide an electrical or optical response to a strain/stress stimulus. The basic requirements of the sensor include:

(i) a wide range of strain/stress detection, i.e. from small strains to failure;
(ii) reversibility upon stimulus removal to enable repeated use of the sensor;
(iii) linearity and repeatability of the response;
(iv) relatively easy and inexpensive measurement of the response;
(v) little or no damage to or ill effect on the structure;
(vi) chemical stability and durability; and
(vii) low component and installation cost (especially important in civil structures).

Sensors currently in use include strain gages, optical fibers and piezoelectric sensors. All of these types of sensors suffer from their high cost, poor durability and the need for expensive peripheral equipment, such as electronics and lasers, for operation. As a result, the use of these sensors in civil structures is far less common than is desirable and is generally limited to laboratory applications. It would be of great benefit to have a strain/stress sensor that meets the above basic requirements and could be implemented easily and relatively inexpensively to avert possible danger to users of composite material structures.

U.S. Pat. No. 3,956,926 to Phillips is illustrative of the use of embedded strain/stress sensors. Phillips drills a bore hole into a structure and inserts a stress-measuring apparatus into the bore. The apparatus is sealed in place and includes a system of pressure transducers that send information to a processing unit via a cable attached to an exposed end of the apparatus. Phillips must alter a portion of the structure in order to measure the stresses to which the structure is subjected. Further, the use of a system of transducers creates the risk of failure of an individual transducer which could affect the whole system. To replace a failed transducer, the apparatus must be removed from the structure, which removal could result in additional damage to the structure and/or the apparatus.

U.S. Pat. No. 4,377,800 to Fuld et al. discloses a strain sensor which is embedded in a concrete structural member. The sensor is carried by a hollow, tubular carrier member. Wires extend from the sensor, through the concrete structural member, to processing equipment. Here the sensor is an additional component which may fail at some point during the life of the concrete. The cost of structural members is increased by the inclusion of such sensors and replacement of a failed sensor is not possible without significant damage to the concrete structure.

Another embedded strain/stress sensor is disclosed in U. S. Pat. No. 4,849,668 to Crawley et al. However, the type of composite material in which the sensor is used is markedly different from that contemplated by the instant invention. Further, the sensor itself is quite different from the instant invention. Crawley et al. discloses a laminar composite material which includes elements made of piezoelectric material. When the composite material is subjected to stress/ strain, the piezoelectric elements emit electrical signals which can be processed to determine the level of stress/ strain to which the material is subjected. The material of Crawley et al. suffers from the disadvantage of requiring lead wires to extend between the piezoelectric elements and the processing equipment.

U.S. Pat. No. 4,962,668 to Preston et al. discloses a stress monitor similar to that of Phillips. A bore hole must be drilled in the structure to be monitored, and the monitor is fixed in place in the bore hole. The monitor suffers from many of the disadvantages of Phillips.

The following publications also disclose related prior art materials. They are referred to by number and are hereby incorporated by reference, as are the U.S. Patents discussed above.

1. Victor C. Li, "Postcrack Scaling Relations for Fiber Reinforced Cementitious Composites", *ASCE J. Materials in Civil Engineering* 4(1), 41–57 (1992).
2. Pu-Woei Chen and D. D. L. Chung, "Carbon Fiber Reinforced Concrete as a Smart Material Capable of Non-Destructive Flaw Detection", *Smart Mater. Struc.*, 2, 22–30 (1993).
3. Pu-Woei Chen and D. D. L. Chung, "Carbon Fiber Reinforced Concrete as an Electrical Contact Material for Smart Structures", *Smart Mater. Struc.*, 2, 181–188 (1933).
4. Jeng-Maw Chiou, Qijun Zheng and D. D. L. Chung, "Electromagnetic Interference Shielding by Carbon Fiber Reinforced Cement", *Composites*, 20(4), 379–381 (1989).
5. Pu-Woei Chen and D. D. L. Chung, "Concrete Reinforced with up to 0.2 vol. % of Short Carbon Fibers", *Composites*, 24(1), 33–52 (1993).
6. Xiaoming Yang and D. D. L. Chung, "Latex-Modified Cement Mortar Reinforced by Short Carbon Fibers", *Composites*, 23(6), 453–460 (1992).
7. S. Furukawa, Y. Tsuju and S. Otani, "Production and Mechanical Properties of Carbon Fiber Reinforced Cement Composite", *Proc. 30th Japan. Congr. of Material Research*, pp. 149–152 (1986).
8. S. Akihama, T. Suenaga and T. Banno, "Mechanical Properties of Carbon Fibre Reinforced Cement Composites", *Int. J. Cement Composites Lightweight Concrete*, 8, 21–23 (1986).

9. S. Akihama, M. Kobayashi, T. Suenaga, H. Nakagawa and K. Suzuki, *Mechanical Properties of Carbon Reinforced Cement Composite and the Application to Buildings* (Part 2), Kajima Institute of Construction Technology Report 65, October 1986.

10. Y. Ohama, Y. Sato and M. Endo, "Flexural Behavior of Carbon Fiber Reinforced Cement", *Proc. Asia-Pacific Concrete Technology Conf. '86*, pp. 5.1–5.8 (Singapore 1986).

11. S. B. Park and B. I. Lee, "Fabrication of Carbon Fiber Reinforced Cement Composites", *Proc. 1990 Fall Mater. Res. Soc. Symp.*, 211, pp. 247–54 (1991).

12. Q. Zheng and D. D. L. Chung, "Carbon Fiber Reinforced Cement Composites Improved by Using Chemical Agents", *Concr. Cem. Res.*, 19, 25–41 (1989).

13. B. K. Larson, L. J. Drzal and P. Sorousian, "Carbon Fibre-Cement Adhesion in Carbon Fibre Reinforced Cement Composites", *Composites*, 21, 205–15 (1990).

14. Pu-Woei Chen, Xuli Fu, and D. D. L. Chung, "Improving the Bonding between Old and New Concrete by the Addition of Carbon Fibers to the New Concrete," Cem. Concr. Res., 25(3), pp. 491–496 (1995).

15. Pu-Woei Chen, Xuli Fu, and D. D. L. Chung, "Microstructural and Mechanical Effects of Latex, Methylcellulose, and Silica Fume on Carbon Fiber Reinforced Cement", ACI Materials J., in press.

SUMMARY OF THE INVENTION

The instant invention utilizes a new sensor technology in which the material of which a structure is composed is itself the sensor. This eliminates the need to embed strain gages, optical fibers or other sensors in the structure. Thus, the sensor meets all of the requirements discussed above, advantageously providing a non-invasive, relatively inexpensive and easy-to-implement strain/stress sensor.

The concept behind this sensor technology is different from that behind any other existing sensor technology. Previously, the origins of reversible stress-induced electrical effects were known to include:

(i) the change in the electrical resistance of a metal wire or film as a result of straining;
 (ii) the change in light density in an optical fiber upon deformation;
 (iii) the change in the electrical dipole moment per unit volume upon straining (i.e., the piezoelectric effect); and
 (iv) the change in separation between adjacent conducting filler units in a non-conducting matrix (i.e., piezoresistivity, applicable to ductile matrices such as polymers).

Instead of these known origins, the instant invention takes advantage of the change in crack concentration or size upon the straining of a composite material containing electrically conducting fibers and a somewhat conductive matrix. An increase in crack concentration or size causes an increase in the amount of fiber pull-out, resulting in an increase in the electrical resistance, which is the measured response to the strain/stress stimulus. The ability to control the crack opening so that it can be apparently reversible (as observed electrically) is the key to the ability of the material to serve as a sensor.

Composite materials, such as concrete, are somewhat electrically conducting, and so can satisfy a basic requirement for use of the invention. A second requirement is that cracking can be detected and controlled rather than being allowed to occur catastrophically. The composite materials used with the invention meet this second requirement by bridging of the cracks with electrically conductive fibers [1]. A third requirement is that the fibers be much more conductive than the composite material matrix, so that the fibers contribute to the electrical conductivity of the material.

The composite material of the invention can take the form of materials used in masonry, such as cement, mortar, and concrete, and can be used in the construction of structures such as highways, bridges, buildings, dams, or any other type of structure in which regular cement, mortar, or concrete is typically used. The material includes electrically conductive fibers which not only decrease the electrical resistivity of the material, but also enhance the strength and performance characteristics of the material.

The disadvantages suffered by the prior art are overcome by the instant invention. Strain/stress can be monitored using the invention without the usual invasion and destruction of the structure to be monitored. Because the sensor is the base construction material itself, and because it operates on the principle of crack opening and closing, the sensor has the same life as the structure it measures. When the sensor fails, this is indicative of failure or imminent failure of the structure, so replacement of a sensor alone is not an issue.

DESCRIPTION OF THE PREFERRED EMBODIMENT

One of the earliest discussions of the behavior of carbon fiber reinforced concrete was given by the authors in Ref. 2, but was limited to the smart behavior of mortars during compressive deformation. The invention extends the application of fiber-reinforced composites beyond compression to tension and flexure, from carbon to other electrically conductive fibers, and from mortars to other types of composite materials.

The ability to serve as a stress sensor is related to the ability to monitor structural integrity in-situ. This means that a highway using concrete reinforced with electrically conductive fibers, as a result of its composition, can itself be used to measure strain or stress it experiences. This measurement can then be used to determine the pressure (weight) on the highway for traffic monitoring in real time.

Figure 9:
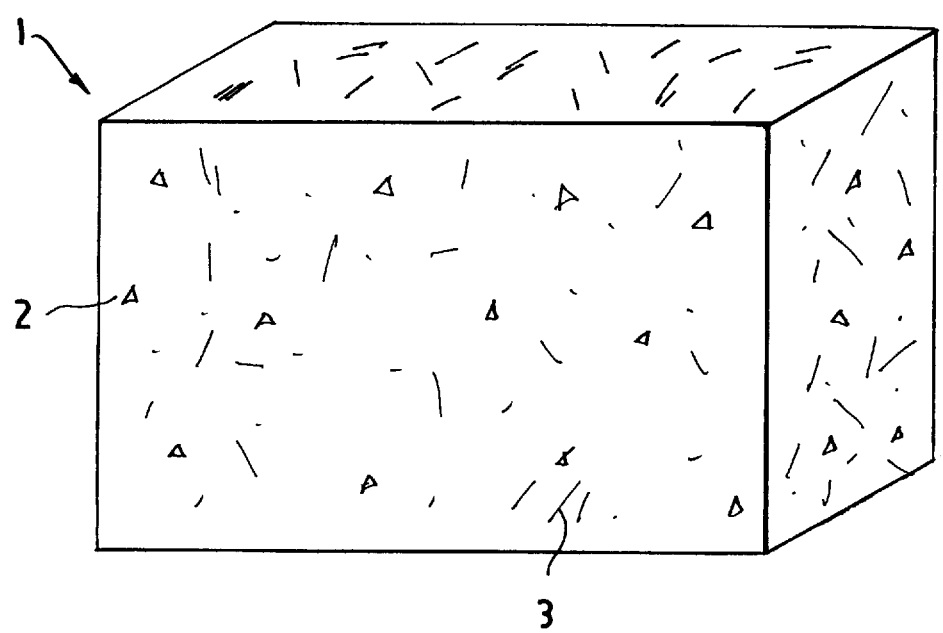
FIG. 9 is a schematic representation of an embodiment of the invention.

FIG. 9 is a schematic representation of the invention showing the composite material 1, comprising a base material or matrix (concrete, mortar, or the like) 2, and fibers 3. The addition of electrically conductive fibers to composite materials such as concrete not only decreases the volume resistivity of the concrete, but also decreases the contact resistivity between concrete and a metal [3]. The decrease in contact resistivity is a consequence of the partial protrusion of the short carbon fibers from the surface of the material. As a result of the protrusion of the fibers, electrical probing of the material or structure with a probe is very convenient—a good electrical contact can be achieved simply by touching the surface of the material with the probe. No conducting medium (such as silver paint) is required between the material and the probe as would be required with conventional materials.

An increase in the electromagnetic interference (EMI) shielding effectiveness of the material [4] is also associated with the decrease in the volume electrical resistivity. The shielding ability is valuable in, for example, the construction of structures housing electronics sensitive to the influence of external electromagnetic fields. An increase in anti-static ability also results, which is useful, for example, in the construction of the floors of buildings housing electronics that are sensitive to electrostatic fields.

The inventive addition of electrically conductive fibers 3 to composite materials not only enables in-situ monitoring of stress, strain, and structural integrity, but it also makes the subject material a better structural material. Increases in the flexural strength, improvements in flexural toughness [5–13] and freeze-thaw durability [5], and a decrease in the drying shrinkage [5] result from the addition of the fibers. The decrease in drying shrinkage is beneficial in structural repair because the bonding between materials such as old concrete (already shrunk) and new concrete is much improved if the new concrete contains the fibers [14].

Effective use of electrically conductive fibers in concrete requires dispersion of the short fibers, which are preferably on the order of only 10 μm in diameter. In the preferred embodiment, dispersants are added to the material to enhance the dispersion of the fibers [15]. Examples of suitable dispersants are methylcellulose [5], latex [6] and silica fume [5–13]. The effect of the dispersant on the sensing ability is disclosed, as well as the structural properties of the concrete.

Figure 1:
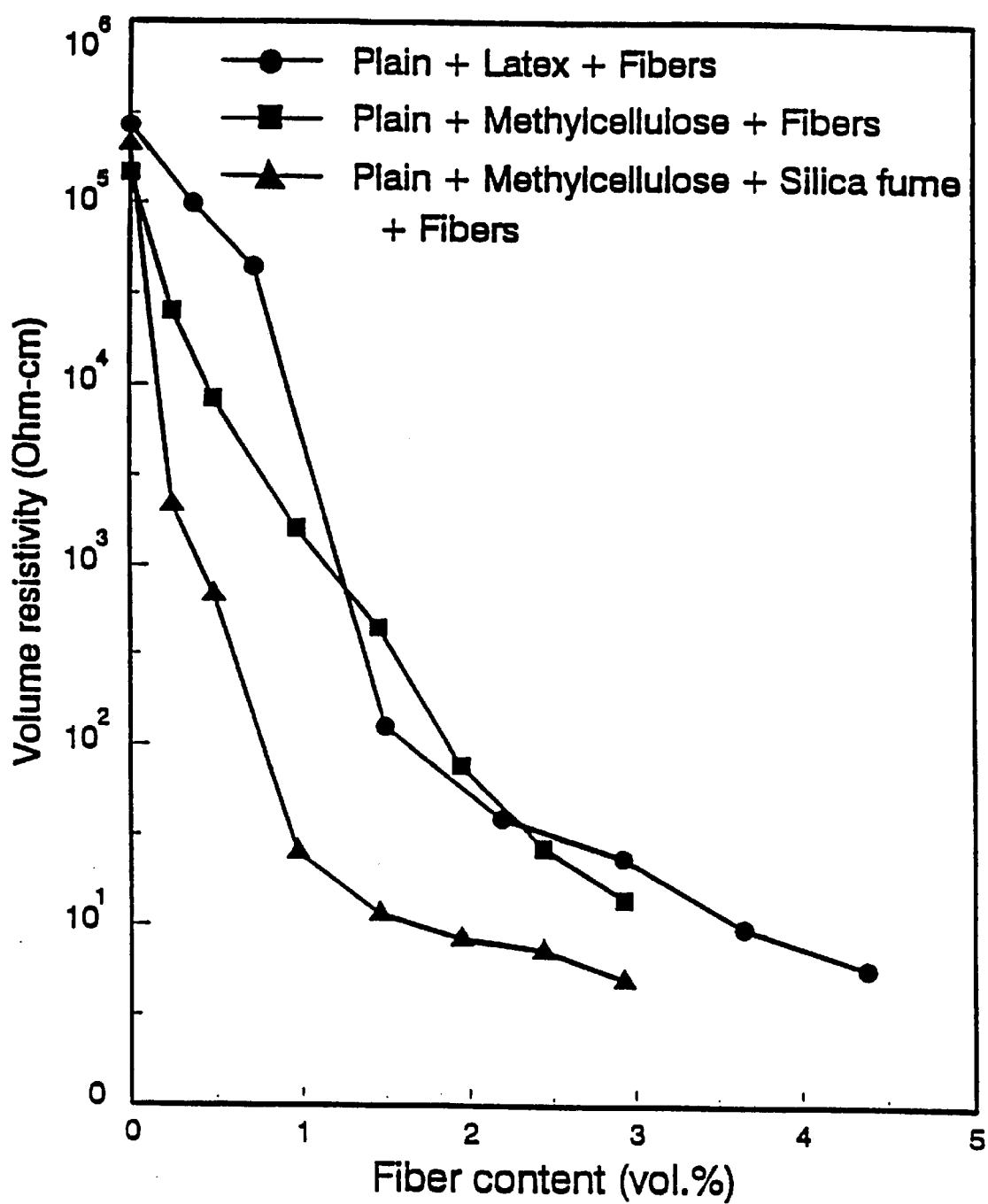
FIG. 1 is a plot of volume electrical resistivity vs. carbon fiber volume fraction for mortars containing (a) latex, (b) methylcellulose, and (c) methylcellulose+silica fume.

While any suitable electrically conductive fibers can be used, the preferred embodiment uses carbon fibers that are short, isotropic pitch based and unsized with properties as shown in Table 1. The preferred nominal fiber length is 5 millimeters. The amount of fibers used in the material is preferably used in the amount of 0.5% by weight of cement, though variations in this value are within the scope of the invention. For concrete, the preferred aggregate is natural sand (100% passing 2.36 millimeter sieve, 99.91% $SiO_2$), the particle size analysis of which is well known and is shown in FIG. 1 of Ref. 15. Table 2 describes the various raw materials which can be used. Table 3 describes four types of mortar that can be used. They are (i) plain mortar, (ii) plain mortar with latex, (iii) plain mortar with methylcellulose, and (iv) plain mortar with methylcellulose and silica fume. The latex, methylcellulose and silica fume are added to disperse the fibers. The remainder of the specification will describe the invention in terms of these four examples, though it will be apparent to those skilled in the art that the invention is not limited to these examples.

A water reducing agent powder, such as TAMOL SN (Rohm and Haas), can be used which preferably contains 93–96% sodium salt of a condensed naphtholenesulfonic acid. In general, the slump of carbon fiber reinforced cement tends to decrease with increasing carbon fiber content. The water reducing agent should be used in an amount sufficient to maintain the mortar at a preferred flow value in the range of 150±50 millimeters.

The latex is preferably a styrene butadiene copolymer used in a preferred amount of 20% of the weight of the cement. An antifoam agent (such as Dow Corning 2410) can be used in the amount of 0.5% of the weight of the latex whenever latex is used. Methylcellulose, when used, should be added at a preferred amount of 0.4% of the cement weight. A defoamer (such as Colloids 1010) can be used along with the methylcellulose in the amount of 0.13 vol. %; it should be used whenever methylcellulose is used.

Mixing Procedure

A Hobart mixer with a flat beater can be used for mixing and was used during experimentation, though this is not necessarily the best device for the job. Any suitable mixer can be used. For the case of mortar containing latex, the latex, antifoam and the fibers (preferably carbon) should first be mixed for about 1 minute (by hand during experiments) and then cement, sand, water and the water reducing agent should be successively added and mixed for around 5 minutes. For the case of mortar containing methylcellulose, the defoamer and then the fibers should be added to an aqueous methylcellulose solution and stirred for about 2 minutes. Then this mixture, cement, sand, water and water reducing agent (and silica fume, if applicable) should be mixed for around 5 minutes.

For the case of concrete using methylcellulose and silica fume, the mixing procedure is quite similar to that for the corresponding mortar. Methylcellulose is first dissolved in water. After that, the defoamer and then the fibers are added and stirred for about 2 minutes. Then this mixture, cement, a fine aggregate (such as Aggregate B described in Ref. 5), silica fume and then the water reducing agent are mixed for about 5 minutes in, for example, a mixer. Subsequently the mix is poured into a stone concrete mixer to which a coarse aggregate (such as Aggregate D described in Ref. 5) is added and then mixing is conducted for about 3 minutes. After pouring the mix, a vibrator can be used to decrease the amount of air bubbles.

Curing procedure

The material is preferably kept in a mold or the like for about a day, and is then demolded and allowed to cure for about a week. During experiments, specimens were poured into oiled molds. The specimens were demolded after 1 day and then allowed to cure at room temperature in air for 7 days. Regular room humidity about 10% relative humidity, was used, though in some cases, 60% relative humidity was used.

Testing Procedure During Experiments

Resistance measurements were all made using direct current in the range from 0.1 to 4 Amperes. The specimen dimensions depended on the deformation mode—compressive, tensile or flexural. They are all in accordance with ASTM standards for mortars and concretes. For all the tests, six specimens of each type were used.

For compressive testing according to ASTM C109-80, mortar specimens were prepared by using a 2×2×2 inches (5.1×5.1×5.1 centimeters) mold. For compressive testing according to ASTM C39-83b, concrete specimens were prepared using a 102 millimeters (4 inches) diameter×203 millimeters (8 inches) length mold. Compression testing was performed using a hydraulic Material Testing System (MTS). The cross-head speed was 1.27 millimeters/minute, unless noted otherwise.

Dog-bone shaped specimens of dimensions 80×60×20 millimeters in the narrowest part of the dog-bone shape were used for tensile testing. They were prepared by using molds of the same shape and size. Tensile testing was performed using a screw-type mechanical testing system (Sintech 2/D). The loading speed was 1.27 millimeters/minute, unless noted otherwise.

During compressive or tensile loading up to fracture, the strain was measured by the cross-head displacement in compressive testing or by a strain gage in tensile testing, while the fractional change in electrical resistance was measured using the four-probe method. Unless stated otherwise, the resistance was measured along the stress axis. However, in some cases, the resistance was also measured in the direction perpendicular to the stress axis. When the resistance was measured along the stress axis, the electrical contacts were made by silver paint applied along the whole perimeter in four parallel planes perpendicular to the stress axis. When the resistance was measured perpendicular to the stress axis, electrical contacts were made by silver paint applied on each of two opposite surfaces of the sample parallel to the stress axis and on two parallel lines on one of the remaining surfaces parallel to the stress axis, such that the two lines were both parallel to the stress axis. In all cases, the inner two contacts were for voltage measurement, while the outer two contacts were for passing a current. Although the spacing between the contacts increased upon tensile deformation and decreased upon compressive deformation, the increase was so small that the measured resistance remained essentially proportional to the volume resistivity. Testing was performed either in one cycle up to the breaking stress or in multiple cycles upon loading up to a fraction of the breaking stress (compressive/tensile). The fractions is loading used were about ⅓ under compression and approximately ½ under tension, unless stated otherwise.

Flexural testing was performed by three-point bending (ASTM C348-80), with a span of 140 millimeters (5.5 inches). The specimen size was 40×40×160 millimeters. Flexural testing was performed using a screw-type mechanical testing system (Sintech 2/D). The cross-head speed was 1.27 millimeters/minute. During flexural loading up to fracture, the fractional change in electrical resistance was measured separately at the top surface (side under compression) and the bottom surface (side under tension). Electrical contacts were made by silver paint applied along four parallel lines (perpendicular to the long axis of the specimen) on each of the two opposite surfaces of the specimen.

Results of Experiments and Discussion of the Invention in General

Table 4 summarizes the results of simultaneous compressive/tensile flexural testing and electrical resistivity measurement along the stress axis. The mechanical testing results include the ultimate strength and ductility. The electrical probing gave as raw results the resistance R between the two voltage probes in the four-probe set-up. Table 4 gives the fractional change in R at the point of fracture, i.e. $\Delta R/R_0$ where $R_0$ is the original resistance. The resistivity $\rho$ is related to the resistance R by the equation $$\rho = R(A/d), \quad (1)$$

where A is the cross-sectional area and d is the distance between the voltage probes. For compressive testing, d=1 centimeter and 4 inches for mortars and concretes, respectively; for tensile testing d=4 centimeters (for mortars only); for flexural testing d=8 centimeters (for mortars only). Since the dimensional changes are small during the deformation up to fracture, the fractional change in the electrical resistivity (i.e., $\Delta\rho/\rho_0$, where $\rho_0$ is the original resistivity) is almost the same as $\Delta R/R_0$. For tensile and flexural testing, $\Delta R/R_0$ exactly equals $\Delta\rho/\rho_0$ because of the low ductility under tension or flexure. For compressive testing, $\Delta\rho/\rho_0$ is slightly larger than $\Delta R/R_0$. For example, $\Delta R/R_0$, values of 4.1, 10.42, and 21.14 correspond to $\Delta\rho/\rho_0$ values of 4.1, 10.44 and 21.18, respectively. The quantity $\Delta R/R_0$ is more suitable for application of the in-situ structural integrity monitoring technique of the invention in the field. The quantity $\Delta\rho/\rho_0$ is more meaningful scientifically.

In compressive, tensile and flexural cases, $\Delta R/R_0$ is positive, i.e., the resistivity increases as deformation takes place. This is because flaws are generated as deformation occurs. However, $\Delta R/R_0$ at fracture is much larger under compression than under tension or flexure. This is due to the much higher ductility under compression than under tension or flexure. In all cases where the mortar contains no fibers, $\Delta R/R_0$ varies randomly with strain/stress, though the amplitude of the variation is large and is smaller under both compression and tension in the presence of latex or methylcellulose or methylcellulose+silica fume, as shown in Table 4. In other words, there was no correlation between $\Delta R/R_0$ and strain/stress. Thus, the desired behavior of the material is dependent on the presence of the electrically conductive fibers.

The magnitude of $\Delta R/R_0$ depends in part on the non-fiber ingredients in the materials, especially in mortars. Under compression, the use of methylcellulose+silica fume in experiments gave the largest $\Delta R/R_0$, while the use of latex gave the smallest. Under tension, the use of latex gave the largest $\Delta R/R_0$ while the use of methylcellulose gave the smallest. Under flexure, the use of methylcellulose gave the largest $\Delta R/R_0$. These differences are partly due to the dependence of $\rho_0$ on the type of ingredients present, as these ingredients help the dispersion of the fibers and are present at different concentrations (Table 3).

At a given fiber volume fraction, latex yielded higher $\rho_0$ than either methylcellulose or (methylcellulose+silica fume), whether fibers were present or not. When fibers were absent, methylcellulose yielded the lowest $\rho_0$. When fibers were present, methylcellulose+silica fume yielded the lowest $\rho_0$; this is partly why methylcellulose+silica fume gave the highest $\Delta R/R_0$ under compression to fracture. Another reason is that methylcellulose+silica fume gave the highest compressive ductility when fibers were present.

Since methylcellulose+silica fume gave higher $\rho_0$ than methylcellulose without silica fume when fibers were absent, but lower $\rho_0$ than methylcellulose when fibers were present, the silica fume appears to help the fiber dispersion, thereby making the fibers more effective in lowering the resistivity. Since the desired performance of the materials was observed in all the fiber-containing mortars and not observed in any of the mortars without fibers, the maximum $\rho_0$ allowed for a mortar with sensing ability appears at first to be between $1.12 \cdot 10^5$ and $1.46 \cdot 10^5$ $\Omega \cdot$cm (see Table 3). However, the small difference in resistivity between mortars without fibers and those with fibers suggests that the decrease in resistivity alone cannot explain why the fibers enable the mortar to be used in the desired fashion. The effect of the fibers on cracking plays an important role, as described later.

Simultaneous tensile testing and electrical resistivity measurement along the stress axis were conducted on mortars with fiber volume fractions 0.53%, 1.06%, 2.12%, 3.18% and 4.24% (corresponding to fibers in amounts of 0.5%, 1.0%, 2.0%, 3.0% and 4.0% of the cement weight). The results are shown in Table 5. The tensile strength increased with increasing fiber content up to 2.12% for the cases of mortars with latex or methylcellulose and 3.18% for the case of mortar with methylcellulose and silica fume. Above these fiber contents, the tensile strength decreased, due to the decreased workability and the resulting higher void content [15]. The value of $\Delta R/R_0$ did not vary much with the fiber content (Table 5), even though the value of $\rho_0$ decreased significantly with increasing fiber content (Table 5 and FIG. 1). This means that a very low electrical resistivity is not required to achieve the desired sensing ability since a low value of $\rho_0$ does not result in a large value of $\Delta R/R_0$.

Figure 2:
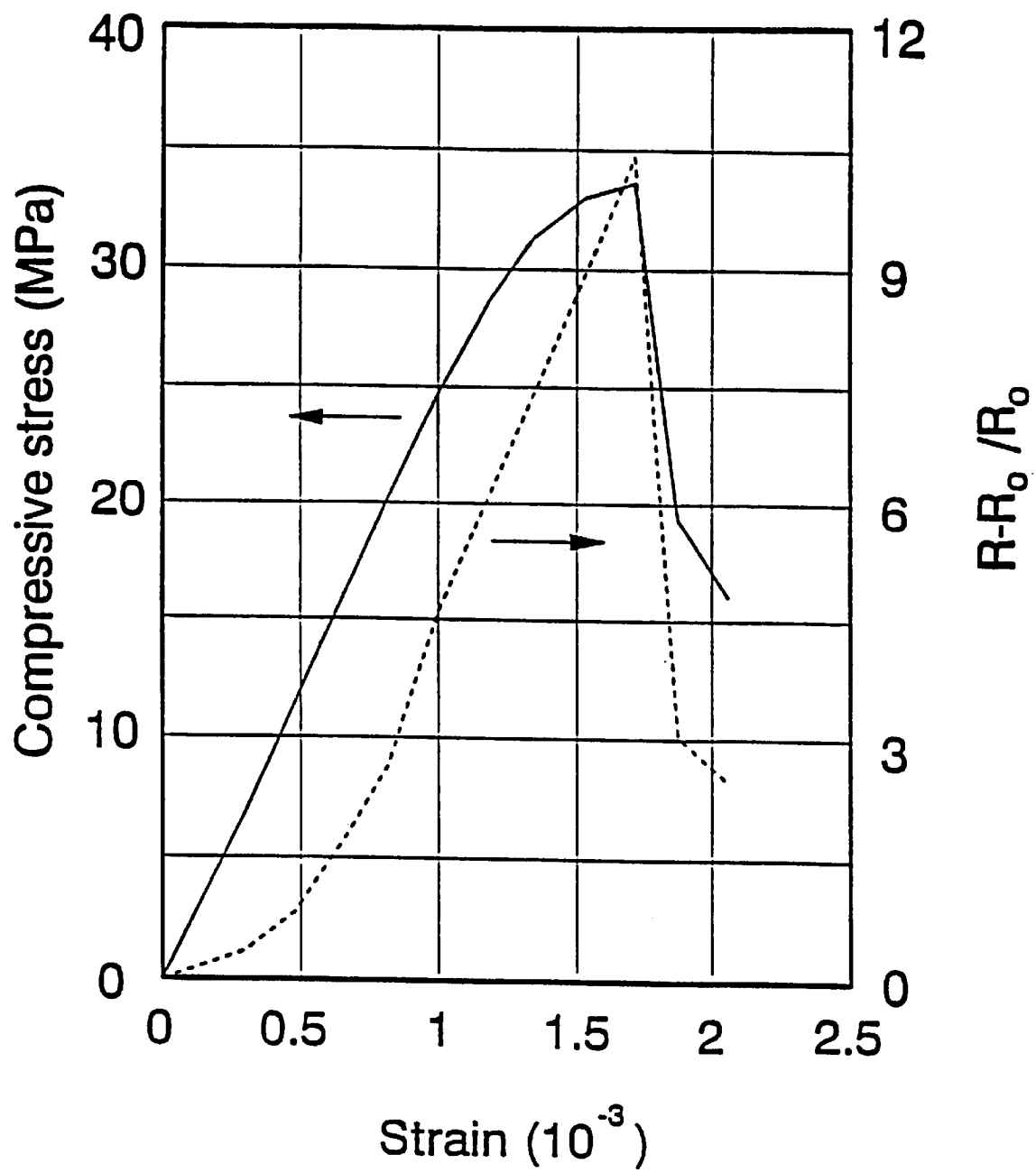
FIG. 2 is a plot of $\Delta R/R_0$ vs. strain and plot of stress vs. strain during static compressive testing for mortar containing methylcellulose and 0.24 vol. % fibers.
Figure 3:
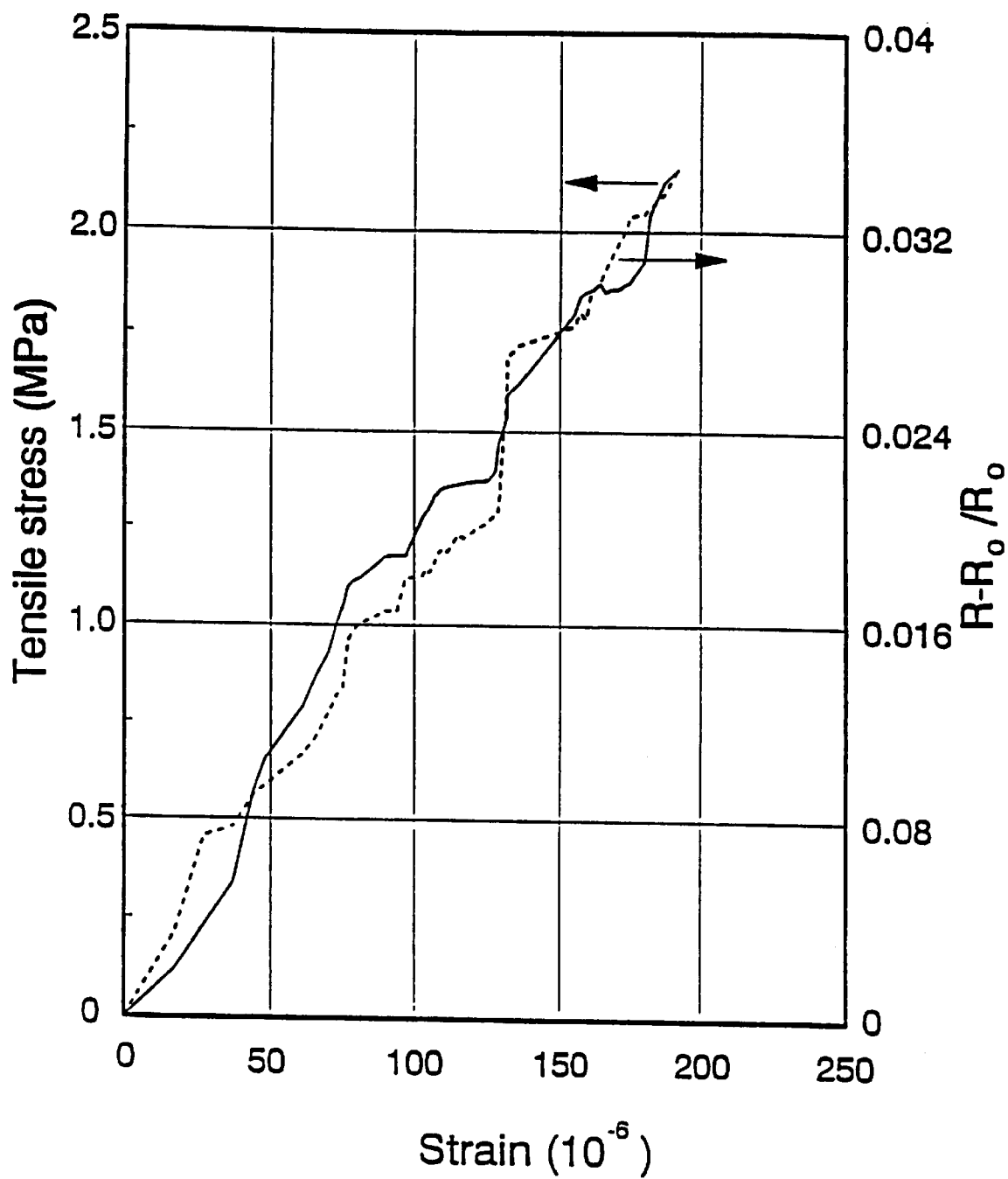
FIG. 3 is a plot of $\Delta R/R_0$ vs. strain and plot of stress vs. strain during static tensile testing for mortar containing methylcellulose and 0.53 vol. % fibers.
Figure 4:
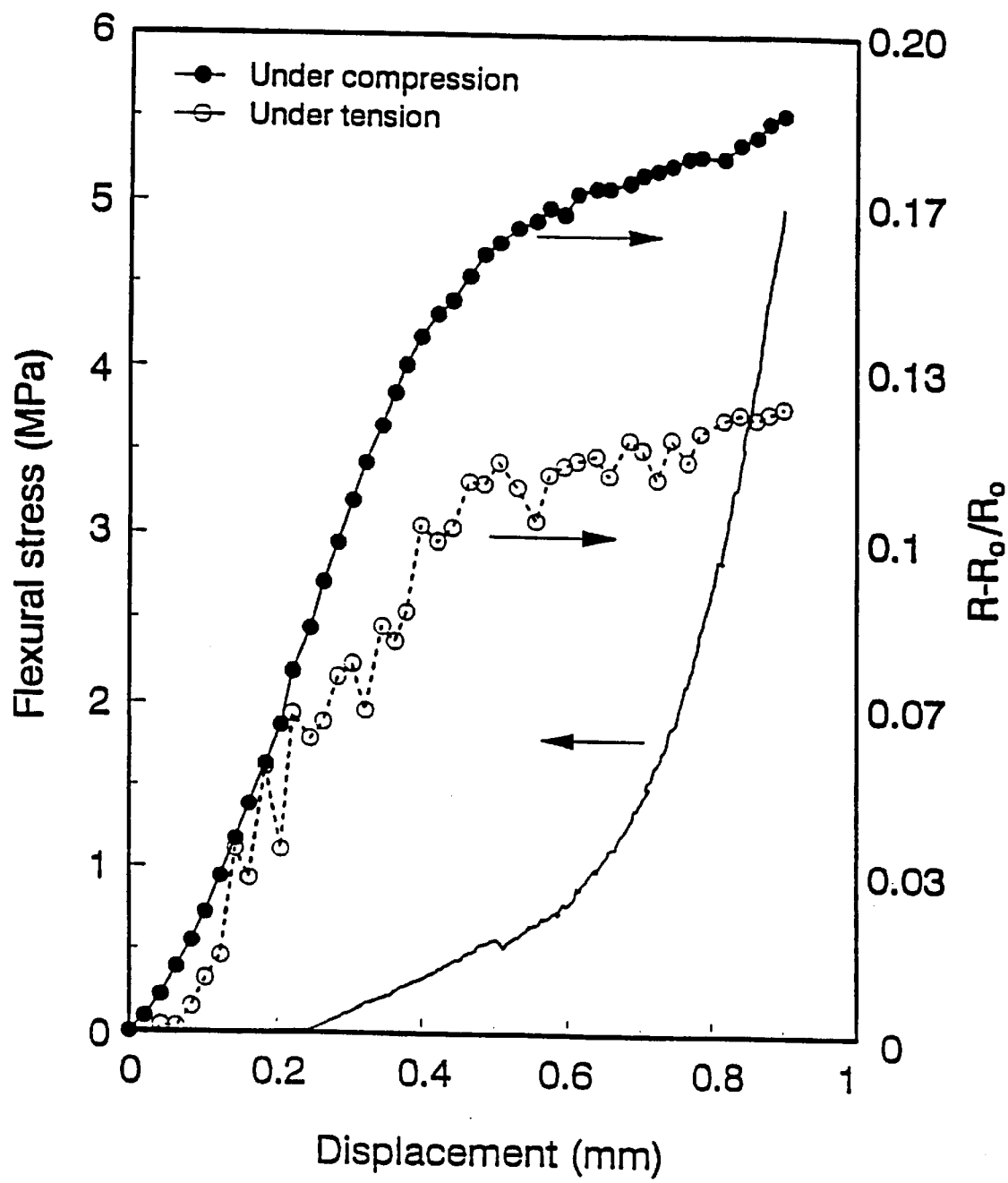
FIG. 4 shows plots of $\Delta R/R_0$ (at the compression side and tension side of the specimen) vs. displacement and plot of stress vs. displacement during static flexural testing for mortar containing methylcellulose and 0.35 vol. % fibers.
Figure 5:
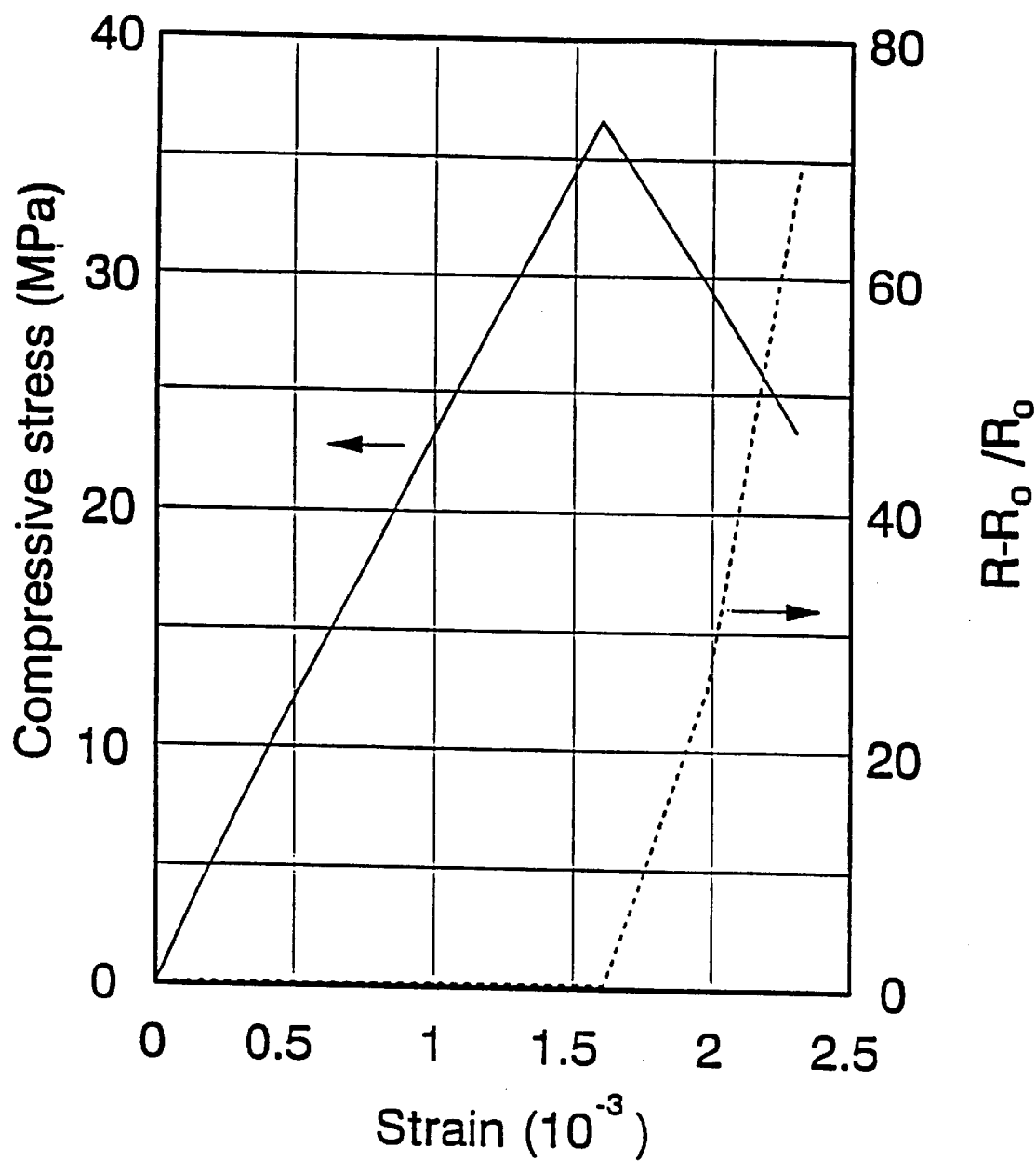
FIG. 5 is a plot of $\Delta R/R_0$ vs. strain and plot of stress vs. strain during static compressive testing for plain mortar.
Figure 6:
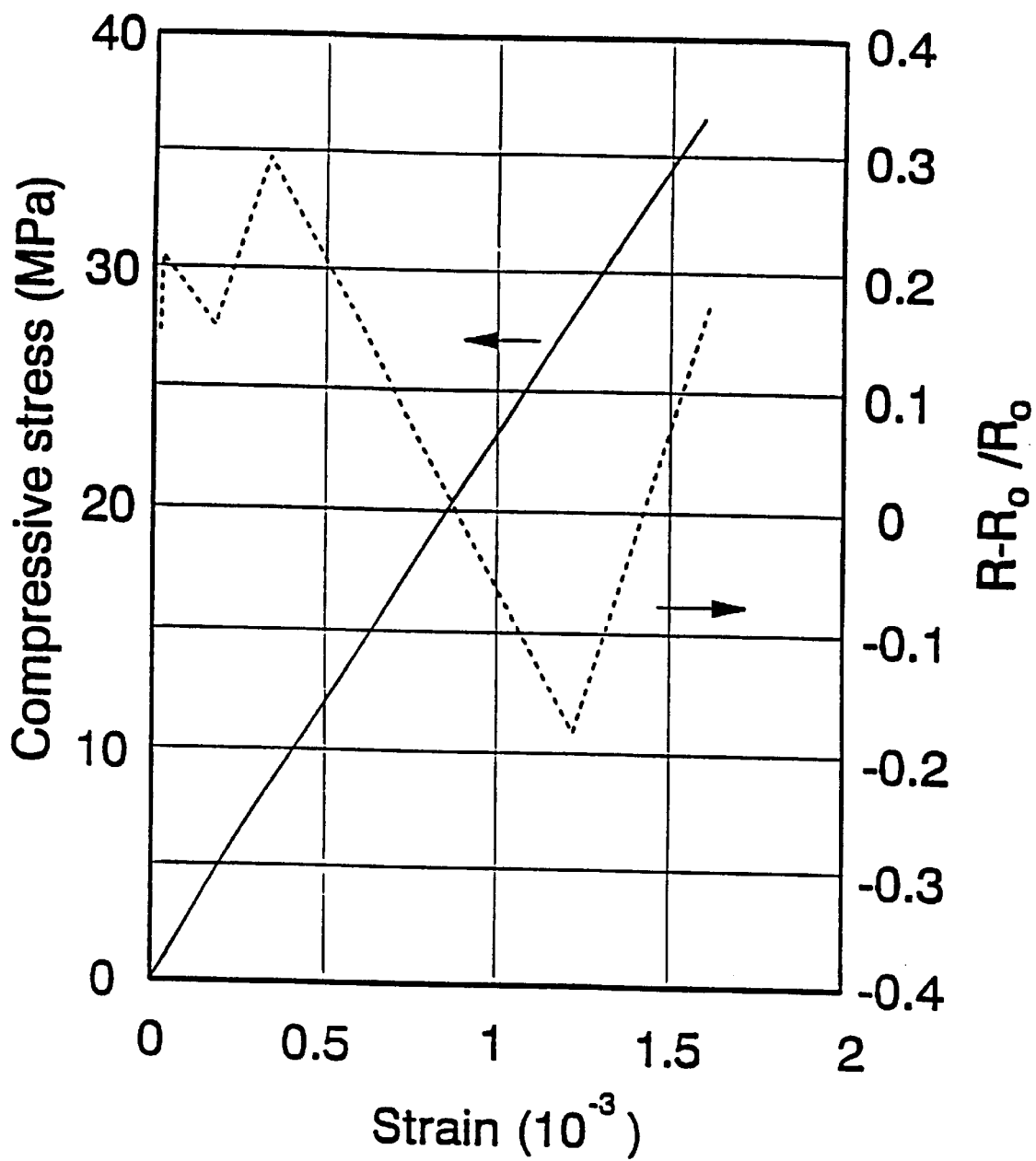
FIG. 6 is a plot of $\Delta R/R_0$ vs. strain and plot of stress vs. strain during static compressive testing for plain mortar. The zero of the scale for $\Delta R/R_0$ is half way up the graph, in contrast to FIGS. 2–5.

FIGS. 2–4 give the plot of $\Delta R/R_0$ vs. strain (or displacement in the case of flexural loading), together with the simultaneously obtained plot of stress vs. strain (or displacement in the case of flexural loading), for compressive, tensile and flexural loading respectively for mortars containing methylcellulose and fibers. In the case of flexural loading, $\Delta R/R_0$ is given for the side of the specimen under compression as well as the side of the specimen under tension; $\Delta R/R_0$ is larger for the side under compression. FIGS. 5 and 6 give the plots obtained under compression for plain mortar (without any dispersant or fiber). As shown by FIG. 6, $\Delta R/R_0$ has no correlation with strain/stress when fibers were absent. FIG. 5 (which is FIG. 6 in a coarser vertical scale) shows that upon compressive fracture, $\Delta R/R_0$ abruptly increases in plain mortar, because of cracking. Thus, plain mortar can provide one-time (not repeated) failure sensing. In contrast, the addition of fibers allows dynamic sensing, even at strains way before fracture. Another contrast is that the addition of fibers causes $\Delta R/R_0$ to abruptly decrease (not increase) upon compressive fracture (FIG. 2), probably because the highly conducting fibers collapse together upon compressive fracture.

Because $\Delta R/R_0$ is much larger under compression than under tension, the curve of $\Delta R/R_0$ vs. strain is less noisy under compression than under tension. Therefore, consideration of the shape of the curve of $\Delta R/R_0$ vs. strain is more meaningful under compression than under tension. Comparison of such curves (such as that shown in FIG. 2) under compression for the three dispersants shows that the curve for the case of methylcellulose is substantially linear. However, all three curves deviate from linearity in a concave upward fashion, i.e. $\Delta R/R_0$ is less than the value corresponding to exact linearity when the strain is small.

The relationship between stress and $\Delta R/R_0$ (as shown in FIGS. 2–4) can be used as a calibration curve that allows mortars to be used as compressive/tensile stress sensors. The linearity of such calibration curves is better for mortars containing methylcellulose than those containing methylcellulose+silica fume or that containing latex.

Table 6 compares the results of simultaneous compressive/tensile testing and electrical resistivity measurement along the stress axis and those perpendicular to the stress axis. The $\Delta R/R_0$ value at fracture is similar for the two directions in either compressive or tensile testing. Table 6 shows that the relative humidity during curing had negligible effect on $\Delta R/R_0$ at compressive/tensile fracture.

Figure 7A:
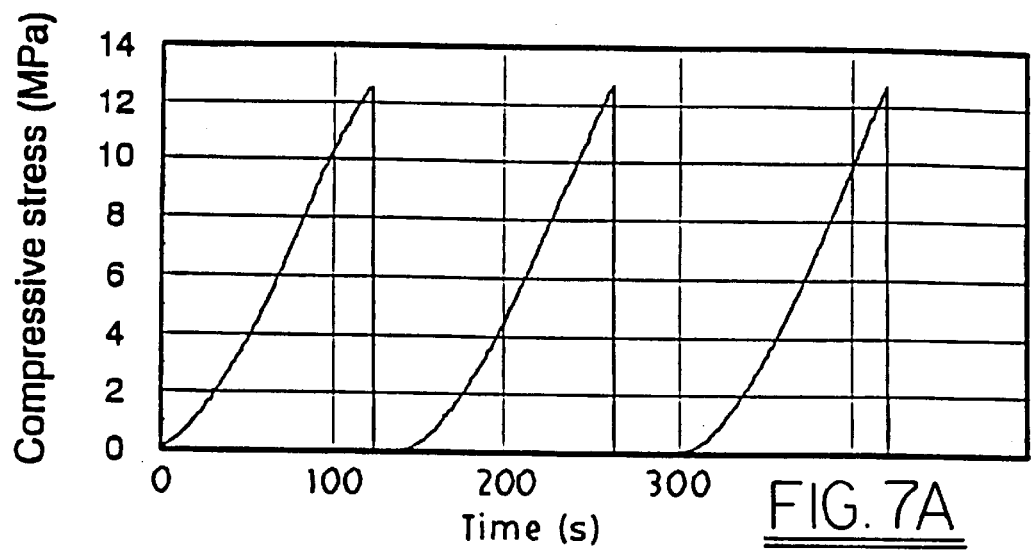
FIG. 7 shows plots vs. time of $\Delta \Delta R/R_0$, compressive strain and compressive stress obtained during cyclic compressive testing for mortar containing methylcellulose and 0.24 vol. % fibers.
Figure 7B:
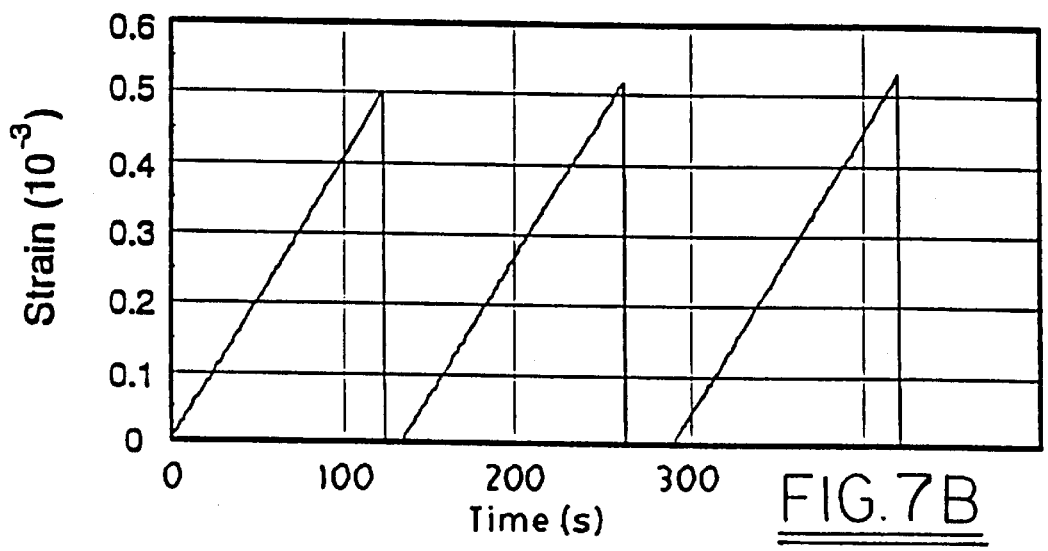
Figure 7C:
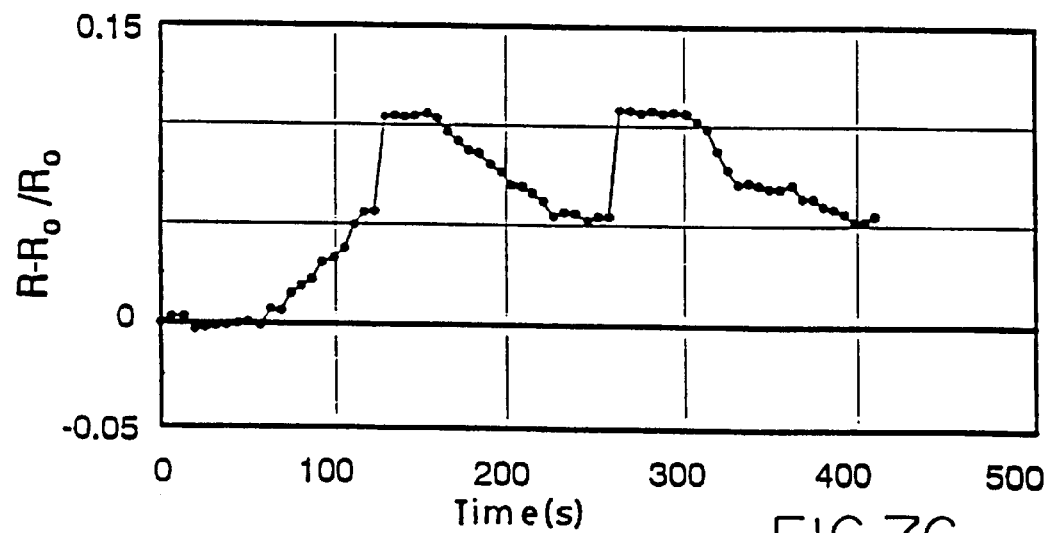
Figure 8A:
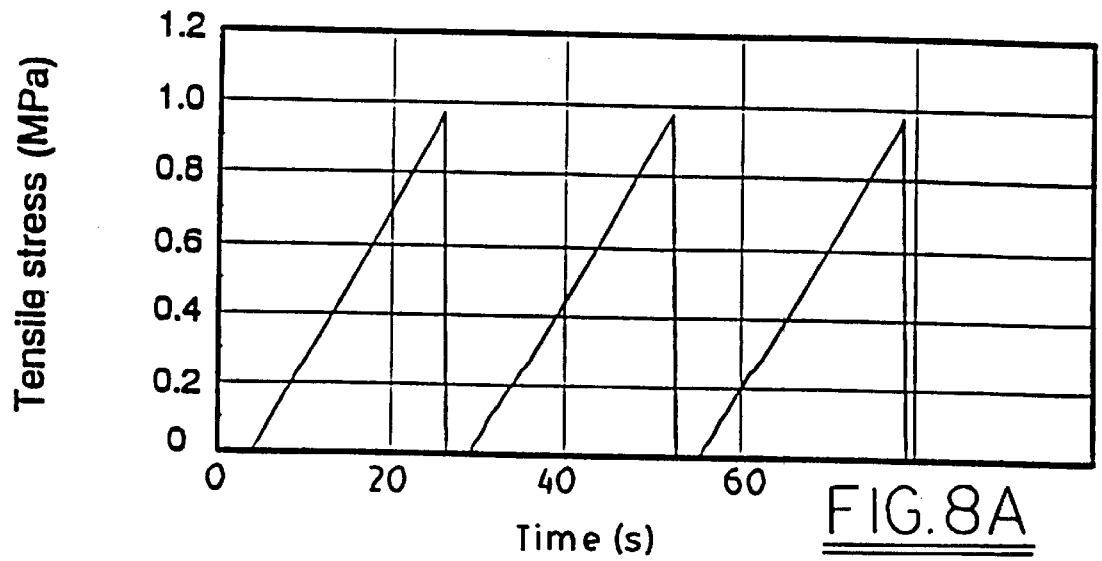
FIG. 8 shows plots vs. time of $\Delta R/R_0$, tensile strain and tensile stress obtained during cyclic tensile testing for mortar containing methylcellulose and 0.53 vol. % fibers.
Figure 8B:
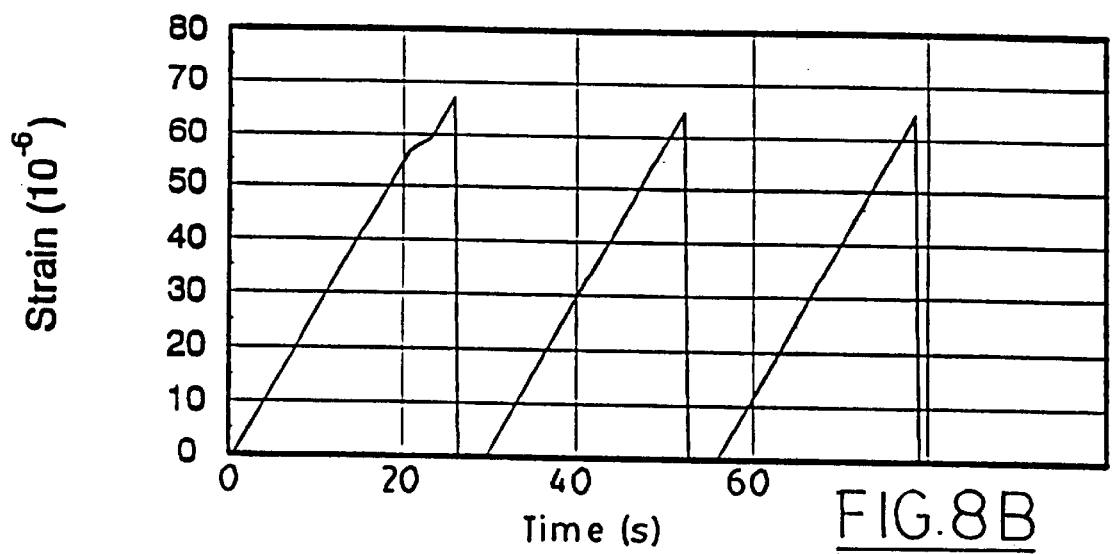
Figure 8C:
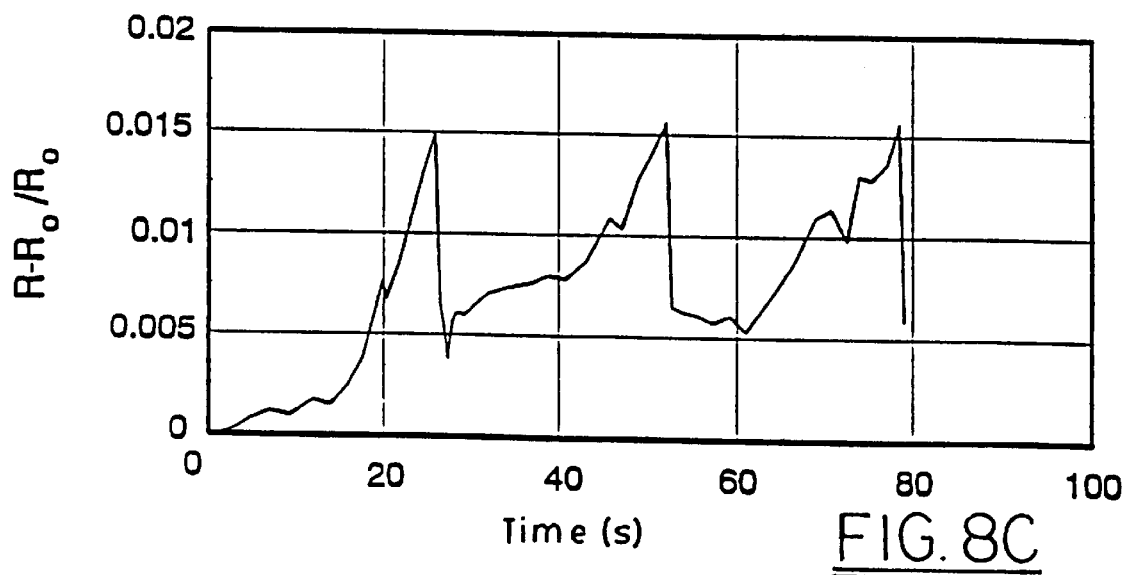

All the performance results given above were obtained during static loading. Consistent results were obtained under cyclic compressive/tensile loading, as described below. Without fibers, the desired sensing ability was not observed. With fibers and methylcellulose, the sensing ability was observed as shown in FIGS. 7 and 8 for cyclic compressive and cyclic tensile loading respectively.

Under cyclic compressive loading within the fully reversible strain regime (FIG. 7), the desired sensing ability was observed via (i) irreversibly increasing $\Delta R/R_0$ during the first loading, (ii) reversibly increasing $\Delta R/R_0$ during unloading in any cycle, and (iii) reversibly decreasing $\Delta R/R_0$ during the second and subsequent loadings.

The irreversibly increasing $\Delta R/R_0$ during the first loading (which involved no irreversible strain) is due to permanent damage, probably associated with the irreversible increase in the contact electrical resistivity at the fiber/matrix interface due to the weakening of that interface. Note that the increase in $\Delta R/R_0$ during first loading cannot be explained by the fibers becoming closer together, as increased proximity of adjacent fibers will decrease R rather than increasing R. The irreversibly changed $\Delta R/R_0$ effectively provides a "memory" indicating that prior loading has occurred.

The reversibly increasing $\Delta R/R_0$ during unloading in any cycle is attributed to crack opening—increase in the length and/or height of a crack and the consequent slight increase in the amount of fiber pull-out and increase in the fiber/matrix contact resistivity. Crack opening tends to be hindered under compressive loading. The increase in the volume fraction of cracks contributes to the increasing $\Delta R/R_0$, but a simple calculation shows that the amount of cracks needed to provide the observed level of $\Delta R/R_0$ is too high, so that the crack volume alone is not sufficient to explain the observed $\Delta R/R_0$.

The reversibly decreasing $\Delta R/R_0$ during the second and subsequent loadings is attributed to crack closure (decrease in the length or height of a crack) under compressive loading. The reversibility of crack opening and closing is attributed to fiber bridging across the crack, with fiber pull-out occurring during crack opening and fiber push-in occurring during crack closing. The occurrence of fiber pull-out requires a relatively weak fiber/matrix interface, which is provided by the interface weakening probably associated with the irreversible increase in $\Delta R/R_0$ prior to the fiber pullout or crack opening. This means that permanent damage occurred early in the elastic deformation regime.

Under cyclic tensile loading within the fully reversible strain regime (FIG. 8), the desired sensing ability was observed via (i) irreversibly increasing $\Delta R/R_0$ during the initial portion of the first loading, (ii) reversibly increasing $\Delta R/R_0$ during the latter portion of the first loading and during any subsequent loading, (iii) reversibly decreasing $\Delta R/R_0$ during unloading in any cycle. The increase in $\Delta R/R_0$ during loading is attributed to crack opening, whereas the decrease in $\Delta R/R_0$ during unloading is attributed to crack closure. The irreversible increase in $\Delta R/R_0$ during the initial portion of the first loading is probably due to permanent damage associated with weakening of the fiber/matrix interface. The subsequent reversible increase in $\Delta R/R_0$ during the first loading is probably caused by crack opening that is reversed during unloading by crack closure. The stress at which the fiber/matrix interface weakening stops, that is the stress at which the irreversible $\Delta R/R_0$ increase ends and the reversible $\Delta R/R_0$ increase starts, is the stress at which the fiber/matrix interface is sufficiently weak for it to not restrain crack opening or fiber pull-out. The cracks under tension were preferentially oriented perpendicular to the stress axis. Similar results for mortars containing fibers, methylcellulose and silica fume and for mortars containing fibers and latex were obtained.

Under both cyclic compression and cyclic tension, the stress/strain at which the irreversible $\Delta R/R_0$ increase starts to occur is the stress/strain at which permanent damage, probably associated with the fiber/matrix interface weakening, starts to occur. Table 7 lists these stress/strain values under compression and tension for three formulations of carbon fiber reinforced mortars. The stress and strain values under both compression and tension are lower for the case of latex than the case of methylcellulose or the case of methylcellulose+silica fume. This means that the fiber/matrix bonding is weaker in the case of latex. For all formulations, the stress for the interface to start to weaken was much lower under tension than compression. This is expected since tension acts in a direction to open up that interface, whereas compression acts to squeeze the interface.

Under cyclic tension, the stress/strain at which the reversible $\Delta R/R_0$ increase starts to occur is the stress/strain at which fiber pull-out (cracking) starts. The values of the strain are for (i) $2.0 \cdot 10^{-8}$ for the mortar with latex and 0.53 vol. % fibers, (ii) $5.7 \cdot 10^{-7}$ for the mortar with methylcellulose and 0.53 vol. % fibers, and (iii) $2.9 \cdot 10^{-7}$ for the mortar with methylcellulose, silica fume and 0.53 vol. % fibers. These strain values ($\sim 10^{-7}$) are much smaller than the values ($\sim 10^{-4}$) at which the tensile stress-strain curves (e.g., FIG. 3) start to exhibit non-linear behavior. Irreversible damage (probably associated with the weakening of the fiber/matrix bonding) occurs before the occurrence of first crack opening (reversible), which in turn occurs much before the point at which the stress-strain curve starts to exhibit non-linear behavior.

While all the data given above were obtained on mortars, consistent results were obtained on concretes, as described below. Without fibers, the desired sensing ability was not observed. The $\Delta R/R_0$ values are much lower for concretes than mortars at similar fiber volume fractions. Table 8 lists the values of $\Delta R/R_0$ (at compressive fracture) and $\rho_0$ for mortars and concretes containing 0.2 vol. % fibers. At the same fiber volume fraction, $\rho_0$ is much higher for concrete than mortar. In spite of the high $\rho_0$ for fiber-reinforced concretes (even higher than those of plain mortars exhibiting no sensing ability as shown in Table 3), the desired sensing ability was observed, indicating that their existence is not governed by $\rho_0$. An increase in the fiber volume fraction in the concrete decreased $\rho_0$ and increased $\Delta R/R_0$, as shown in Table 9, but the increased $\Delta R/R_0$ is still much lower than the values for mortars, even when $\rho_0$ of the concrete is below those of the mortars of Table 3. This means that the low $\Delta R/R_0$ of concretes is not due to the high $\rho_0$, but rather is due to the presence of the coarse aggregate, which makes the cracking control ability of the fibers less prominent. In spite of the low values of $\Delta R/R_0$ for concretes, the measurement of $\Delta R/R_0$ was not difficult, even at the lowest fiber content of 0.19 vol. %

Table 10 shows the reversible and irreversible parts of $\Delta R/R_0$ at the same fraction of the fracture stress relative to $\Delta R/R_0$ at fracture for mortars with different dispersants—about ⅓ under compression and approximately ½ under tension. The fraction $(\Delta R/R_0)_{reversible}/(\Delta R/R_0)_{fracture}$ is much larger than the fraction $(\Delta R/R_0)_{irreversible}/(\Delta R/R_0)_{fracture}$ under compression for mortars when latex is the dispersant, but the two fractions are equal when either methylcellulose or methylcellulose+silica fume is the dispersant. This is attributed to the plastic deformation tendency of latex, which facilitates crack opening and closing, thereby enhancing $(\Delta R/R_0)_{reversible}$ more than $(\Delta R/R_0)_{irreversible}$.

Under tension, the fraction $(\Delta R/R_0)_{reversible}/(\Delta R/R_0)_{fracture}$ is much larger than the fraction $(\Delta R/R_0)_{irreversible}/(\Delta R/R_0)_{fracture}$ for all three dispersant cases. This characteristic under tension is attributed to the more important role of small cracks in affecting fracture in tension than in compression and the fact that cracks that can undergo reversible opening and closing are necessarily small. The fraction $(\Delta R/R_0)_{reversible}/(\Delta R/R_0)_{fracture}$ under tension is higher for the case of methylcellulose+silica fume than the case of methylcellulose or that of latex, because the degree of fiber dispersion is highest in the case of methylcellulose+silica fume [14], and that the fibers are responsible for controlling the crack opening so that reversible crack opening and closing is possible.

Table 11 shows the fractions $(\Delta R/R_0)_{reversible}/(\Delta R/R_0)_{fracture}$ and $(\Delta R/R_0)_{irreversible}/(\Delta R/R_0)_{fracture}$ under compression for mortars and concretes with the same dispersants. Both fractions are much higher for concretes than mortars. This means that crack development occurs earlier (at a lower stress relative to the fracture stress) during deformation in concretes than in mortars, probably because of the decreased effectiveness of the fibers in hindering crack opening when the coarse aggregate is present. That $(\Delta R/R_0)_{reversible}$ dominates $(\Delta R/R_0)_{irreversible}$ in concrete with methylcellulose+silica fume, but not in concrete with methylcellulose (and no silica fume) is attributed to a higher degree of fiber dispersion in the former case [15] and that the fibers are responsible for controlling crack opening.

The fractions $(\Delta R/R_0)_{reversible}/(\Delta R/R_0)_{fracture}$ and $(\Delta R/R_0)_{irreversible}/(\Delta R/R_0)_{fracture}$ vary with the stress amplitude in cyclic loading, as shown in Table 12, where the stress amplitude is expressed as the maximum stress divided by the fracture stress. The fractions listed are for compression of mortars containing latex and 0.37 vol. % carbon fibers. They increase with increasing stress amplitude, such that they are much larger when the stress amplitude is 0.50 than when the stress amplitude is 0.33 or below. This is attributed to the abrupt increase in crack concentration or size when the stress is increased from 0.33 to 0.50 of the fracture stress.

The fraction $(\Delta R/R_0)_{reversible}/(\Delta R/R_0)_{fracture}$ increases most abruptly as the stress amplitude is increased from 0.33 to 0.40. The ratio of the reversible part of $\Delta R/R_0$ to the irreversible part of $\Delta R/R_0$ is smaller at a stress amplitude of 0.40 or above compared to those at lower stress amplitudes. This is probably a result of an abrupt increase in crack concentration or size due mainly to irreversible crack opening at higher stress amplitudes as opposed reversible crack opening at lower stress amplitudes.

The ratio of the reversible part of $\Delta R/R_0$ to the irreversible part of $\Delta R/R_0$ is largest at a stress amplitude of 0.33 and decreases slightly with decreasing stress amplitude below 0.33. This is probably because there is a minimum amount of irreversible crack opening that is present at all stress amplitudes, so that the reversible part decreases slightly in relative importance when the stress amplitude is decreased below 0.33. At a stress amplitude of 0.40 or above, the ratio of the reversible part of $\Delta R/R_0$ to the irreversible part of $\Delta R/R_0$ is much smaller than that at a stress amplitude below 0.40. This is due to the abrupt increase of the irreversible strain when the stress amplitude is increased from 0.33 to 0.40. As shown in Table 12, the irreversible strain is zero at stress amplitudes of 0.20 and 0.25, is essentially zero at a stress amplitude of 0.33, abruptly increases when the stress amplitude is increased from 0.33 to 0.40, and increases monotonically with increasing stress amplitude from 0.40 to 0.75. On the other hand, the reversible strain does not vary much with the stress amplitude. Table 12 shows good correlation between the irreversible strain and the irreversible part of $\Delta R/R_0$.

The combination of Tables 10 and 12 shows that, at the same stress amplitude of ½ and for the same dispersant (latex), the ratio of the reversible contribution to $\Delta R/R_0$ to the irreversible contribution to $\Delta R/R_0$ is much higher under tension than under compression. This is again attributed to the more important role of small cracks in affecting fracture in tension than in compression and the fact that cracks that can undergo reversible opening and closing are necessarily small. The loading rate had negligible effect on the occurrence of the desired behavior, as shown by measuring $\Delta R/R_0$ under compression at loading rates of 0.64, 1.27, and 2.54 millimeters/minute.

Table 4 also shows significant effects of the fiber addition on the mechanical properties, especially the tensile and flexural properties. The values of the tensile strength for mortars with various fiber volume fractions are shown in Table 5. The effectiveness of the fiber addition on improving the mechanical properties depends on the ingredients (other than the fibers) in the mortar. The use of latex gave the highest tensile and flexural strengths, while the use of methylcellulose+silica fume gave the highest compressive strength. The compressive strength decreased with increasing fiber volume fraction (Table 9). To achieve a high compressive strength at relatively low cost, the lowest fiber content corresponding to a fiber/cement ratio of 0.5% is preferred for both mortars and concretes used as sensors.

Similar effects of the fiber addition on the flexural and compressive properties were observed for concretes as well as mortars. The effects in the case of concrete are described in Table 9 and Ref. 5.

To investigate the origin of the sensing ability provided by the addition of fibers, the effect of the fiber addition on the fracture pattern was microscopically examined. Optical microscope photographs were obtained of the vertical edge surface of mortar cubes that had been compressed vertically on the horizontal surfaces up to about 70% of the fracture stress for (a) the mortar containing latex but no fibers, and (b) the mortar containing latex and 0.37 vol. % fibers. As shown in Table 4, these two mortars have similar compressive strength. The cracks are approximately 1 micrometer in height in (b) and approximately 100 micrometers in height in (a), indicating that the fibers cause crack opening control, which in turn results in the sensing ability.

Optical micrographs were also obtained of the fracture paths of mortars in the form of test specimens that had been fractured under flexure. The fracture path was found to be quite straight in the plain mortar, but was increasingly tortuous and branched as the fiber volume fraction increased. The effect of the fibers on the crack height and crack complexity is consistent with the increased toughness [5] due to the fiber addition. Thus, the role of the fibers is not just to increase the conductivity of the concrete, but is to decrease the crack height and increase the crack complexity. This effect of the fibers on the fracture characteristics is responsible for the sensing ability of the material.

Measurement of $\Delta R/R_0$ during static compression was also conducted on mortars containing polyethylene fibers (Allied-Signal, Inc., Spectra 900, diameter 38 micrometers, length 5 millimeters, density 0.97 g/cm$^3$, in the amount of 0.35 vol. %, and used without any dispersant) instead of carbon fibers. The variation of $\Delta R/R_0$ with strain/stress was random, just like the case of mortars without fibers. Thus, non-conductive fibers added to the base materials do not provide the desired sensing ability.

However, the use of stainless steel fibers (International Steel Wool Co., diameter 60 micrometers, length 5 millimeters, density 7.8 g/cm$^3$, in the amount of 0.35 vol. %, and used without any dispersant) yielded results similar to those observed from the use of carbon fibers. The main difference is that the curve of $\Delta R/R_0$ versus stress or strain is much noisier for stainless steel fibers. This is probably due to poor dispersion and the relatively large diameter of the steel fibers. Improved dispersion can be achieved using different amounts or types of dispersants in the mixture.

The observations regarding the use of various types of conducting (carbon and steel) and non-conducting (polyethylene) fibers suggest that the use of conducting fibers is necessary for the sensing ability of the materials. In other words, the conducting nature of the fibers contributes to the origin of the sensing ability. The importance of the conductive nature of the fibers is because the contact resistivity between the fibers and the matrix increases upon fiber pull-out. This pull-out is very slight (less than 1 micrometer), as shown by optical microscopic observation of irreversibly opened cracks and as compared to the fiber length (about 5 millimeters). Upon fiber push-in, the contact resistivity decreases. Hence, the observed reversible increase in $\Delta R/R_0$ is not simply due to the high resistance of the cracks, but is largely due to the increase in fiber-matrix contact resistivity that accompanies fiber pull-out, which in turn accompanies crack opening. This interpretation is consistent with the fact that for each type of carbon fiber reinforced mortar (different types having different dispersants), the value of the reversible part of $\Delta R/R_0$ is smaller than the fractional increase in resistivity if the carbon fibers were all removed from that mortar, i.e., $(\rho_{without\ fibers} - \rho_{with\ fibers})/\rho_{with\ fibers}$.

In engineering implementation of the inventive materials, two-dimensional or three-dimensional displays of the flaw/stress/strain distribution can be obtained by electrical resistivity tomography. This new sensor technology for concrete may be extended to other brittle composite materials, such as ceramic-matrix composites. Although experiments used mainly carbon fibers to control crack opening, it is within the scope of the invention to use other materials, such as stainless steel fibers and silicon carbide whiskers.

CONCLUSION

Mortars containing 0.2%–4.2% by volume of short carbon fibers and concretes containing 0.2%–1.1% by volume of the fibers are capable of providing nondestructive in-situ structural integrity monitoring and stress/strain sensing via electrical probing. Without the fibers, or with polyethylene fibers instead of carbon fibers, the desired sensing ability is not observed. Fractional increases in the electrical resistivity along the stress axis by up to a value of 21 (i.e., 2100%) during compressive loading to failure, up to 0.053 (i.e., 5.3%) during tensile loading to failure, and up to 0.184 (i.e., 18.4%) during flexural loading to failure are observed in the mortars. The weaker effect during tension or flexure is due to the much lower ductility under tension than compression. Similar effects are observed in the electrical resistivity perpendicular to the stress axis. The effects are similar for different relative humidities during curing.

Besides providing the desired sensing ability, fiber addition at a fiber/cement ratio of only 0.5% increases the tensile and flexural strength, without affecting the compressive properties much. The sensing ability is attributed to the crack height decrease resulted from the fiber addition and the consequent change from catastrophic crack opening to controlled and apparently reversible crack opening. The sensing action manifests itself as an increase in the electrical resistance upon crack opening. The resistance increase is attributed to the increase in fiber-matrix contact electrical resistivity upon fiber pull-out (less than about 1 micrometer), which accompanies crack opening (less than about 1 micrometer).

Both the sensing ability and mechanical properties vary with the ingredients added for dispersing the fibers. Latex gives the highest tensile and flexural strengths and tensile ductility, the weakest sensing ability under compression, the strongest sensing ability under tension, but the most expensive mix. Methylcellulose+silica fume gives the lowest tensile strength and tensile ductility, the highest compressive strength and compressive ductility, and the strongest sensing ability performance under compression. Methylcellulose (without silica fume) gives the lowest compressive strength and compressive ductility, the weakest sensing ability under tension, and the strongest sensing ability under flexure. The linearity between the fractional change in resistance ($\Delta R/R_0$) and strain/stress is best for methylcellulose.

The desired sensing ability is observed under cyclic compressive/tensile loading due to crack opening and closure. The electrical response ($\Delta R/R_0$) is reversible except for the first loading, which is "remembered" by the material. The irreversible part of $\Delta R/R_0$ in the absence of irreversible strain is attributed to permanent damage, probably associated with fiber/matrix interface weakening, whereas the reversible part is attributed to crack opening (fiber pull-out) and crack closing (fiber push-in). The stress at which the irreversible part starts to be non-zero is the stress at which the permanent damage mentioned above starts to occur; this stress is lower for latex than for methylcellulose or methylcellulose+silica fume as the dispersant, and is lower under tension than under compression.

In the case of partly irreversible strain, the irreversible part is partly due to irreversible crack opening (or crack opening without control of a bridging fiber). The ratio of the contribution to $\Delta R/R_0$ by the reversible part to that by the irreversible part depends on the dispersant, the stress amplitude, and the deformation mode (compression or tension). This ratio is higher for latex than for either methylcellulose or methylcellulose+silica fume when the mortar is under compression. It drops abruptly (while the irreversible strain increases abruptly) when the stress amplitude under compression is increased from 0.33 to 0.40, at least for the case of latex as the dispersant. It is much higher under tension than under compression for the same dispersant and the same stress amplitude. Both fractions $(\Delta R/R_0)_{reversible}/(\Delta R/R_0)_{fracture}$ and $(\Delta R/R_0)_{irreversible}/(\Delta R/R_0)_{fracture}$ are higher under tension than compression and are higher for concretes than mortars.

The desired sensing ability was observed in concretes as well as mortars, though $\Delta R/R_0$ is much larger for mortars than concretes because the fibers are less effective in controlling crack opening when a coarse aggregate is present. $\Delta R/R_0$ is similar for mortars with various fiber volume fractions (0.2%–4.2%), but increases slightly with increasing fiber volume fraction (0.2%–1.1%) for concretes. This is due to the lower resistivity ($\rho_0$) of concretes compared to mortars at similar fiber volume fractions. $\Delta R/R_0$ was quite independent of the loading rate.

TABLE 1

Properties of carbon fibers.

| | |
|---|---|
| Filament diameter | 10 $\mu$m |
| Tensile strength | 690 MPa |
| Tensile modulus | 48 GPa |
| Elongation at break | 1.4% |
| Electrical resistivity | $3.0 \cdot 10^{-3}$ $\Omega \cdot$ cm |
| Specific gravity | 1.6 g cm$^{-3}$ |
| Carbon content | 98 wt. % |

TABLE 2

List of raw materials.

| Material | Source |
|---|---|
| Portland cement Type I | Lafarge Corporation (Southfield, MI) |
| TAMOLSN Sodium salt of a condensed naphtholenesulfonic acid (93–96%) Water (51–54%) | Rohm and Haas Company (Philadelphia, PA) |
| MethoceL A15-LV Methylcellulose | Dow Chemical Corporation (Midland, MI) |
| Colloids 1010 Defoamer | Colloids, Inc. (Marietta, GA) |
| Latex 460NA Styrene butadiene (40–60%) Water (40–60%) Stabilizer (1–5%) | Dow Chemical Corporation (Midland, MI) |
| Antifoam 2410 Polydimethylsiloxane (10%) Water, preservatives and emulsifiers (90%) | Dow Corning Corporation (Midland, MI) |
| Silica fume | Elkem Materials, Inc. (Pittsburgh, PA) |
| Carboflex Carbon fibers | Ashland Petroleum Co. (Ashland, KY) |

TABLE 3

Mix proportions and electrical resistivity of various types of mortar.

| Test | Sample | Fiber vol. % | Water/ cement ratio | Sand/ cement ratio | Latex/ cement ratio | Meth*/ cement (%) | SF**/ cement ratio | WR‡/ cement (%) | Electrical resistivity ($\Omega \cdot$ cm.) |
|---|---|---|---|---|---|---|---|---|---|
| Compressive | Plain mortar | 0 | 0.45 | 1.5 | 0 | 0 | 0 | 0 | $1.46 \cdot 10^5$ |
| | Plain mortar | 0 | 0.3 | 1.0 | 0.2 | 0 | 0 | 0 | $2.71 \cdot 10^5$ |
| | with latex | 0.37 | 0.3 | 1.0 | 0.2 | 0 | 0 | 0 | $1.05 \cdot 10^5$ |
| | Plain mortar | 0 | 0.45 | 1.5 | 0 | 0.4 | 0 | 0 | $1.47 \cdot 10^5$ |

TABLE 3-continued

Mix proportions and electrical resistivity of various types of mortar.

| Test | Sample | Fiber vol. % | Water/ cement ratio | Sand/ cement ratio | Latex/ cement ratio | Meth*/ cement (%) | SF**/ cement ratio | WR‡/ cement (%) | Electrical resistivity (Ω · cm.) |
|---|---|---|---|---|---|---|---|---|---|
| | with Meth | .240 | 0.45 | 1.5 | 0 | 0.4 | 0 | 2 | $8.33 \cdot 10^4$ |
| | Plain mortar | 0 | 0.45 | 1.5 | 0 | 0.4 | 0.15 | 2 | $2.09 \cdot 10^5$ |
| | with Meth and SF | 0.24 | 0.45 | 1.5 | 0 | 0.4 | 0.15 | 2 | $3.19 \cdot 10^3$ |
| Tensile | Plain mortar | 0 | 0.3 | 0 | 0 | 0 | 0 | 0.5 | $1.50 \cdot 10^5$ |
| | Plain mortar | 0 | 0.23 | 0 | 0.2 | 0 | 0 | 0 | $2.75 \cdot 10^5$ |
| | with latex | 0.53 | 0.23 | 0 | 0.2 | 0 | 0 | 0 | $9.87 \cdot 10^4$ |
| | Plain mortar | 0 | 0.32 | 0 | 0 | 0.4 | 0 | 0.5 | $1.49 \cdot 10^5$ |
| | with Meth | 0.53 | 0.32 | 0 | 0 | 0.4 | 0 | 1 | $2.53 \cdot 10^4$ |
| | Plain mortar | 0 | 0.35 | 0 | 0 | 0.4 | 0.15 | 3 | $2.32 \cdot 10^5$ |
| | with Meth and SF | 0.53 | 0.35 | 0 | 0 | 0.4 | 0.15 | 3 | $2.14 \cdot 10^3$ |
| Flexural | Plain mortar | 0 | 0.475 | 1.0 | 0 | 0 | 0 | 0.5 | $1.46 \cdot 10^5$ |
| | Plain mortar | 0 | 0.23 | 1.0 | 0.2 | 0 | 0 | 0.5 | $2.71 \cdot 10^5$ |
| | with latex | 0.35 | 0.23 | 1.0 | 0.2 | 0 | 0 | 1.5 | $1.12 \cdot 10^5$ |
| | Plain mortar | 0 | 0.475 | 1.0 | 0 | 0.4 | 0 | 1 | $1.47 \cdot 10^5$ |
| | with Meth | 0.35 | 0.475 | 1.0 | 0 | 0.4 | 0 | 1 | $5.73 \cdot 10^4$ |
| | Plain mortar | 0 | 0.475 | 1.0 | 0 | 0.4 | 0.15 | 2 | $2.09 \cdot 10^5$ |
| | with Meth and SF | 0.35 | 0.475 | 1.0 | 0 | 0.4 | 0.15 | 2 | $2.80 \cdot 10^3$ |

*Meth = Methylcellulose
**SF = silica fume
‡WR = water reducing agent

TABLE 4

Results of simultaneous compressive/tensile/flexural testing and electrical resistivity measurement along the stress axis.

| | Compressive | | | Tensile | | | Flexural | | |
|---|---|---|---|---|---|---|---|---|---|
| | Strength (MPa) | Ductility (%) | ΔR/R₀‡ | Strength (MPa) | Ductility (%) | ΔR/R₀‡ | Strength (MPa) | Ductility (%) | ΔR/R₀‡* |
| Plain mortar | 35.6 | 0.16 | 69.5 | 0.88 | 0.004 | 0.88 | 3.64 | 0.002 | 0.59/0.72 |
| L | 38.6 | 0.24 | 30 | 3.03 | 0.0352 | 0.6 | 5.99 | 0.003 | 0.21/0.70 |
| L + 0.37 vol. % F | 37.8 | 0.17 | 4.1 | — | — | — | — | — | — |
| L + 0.53 vol. % F | — | — | — | 3.15 | 0.0413 | 0.053 | — | — | — |
| L + 0.35 vol. % F | — | — | — | — | — | — | 8.64 | 0.006 | 0.136/0.058 |
| M | 34.5 | 0.17 | 3.4 | 1.37 | 0.0209 | 0.18 | 3.43 | 0.005 | 1.76/0.55 |
| M + 0.24 vol. % F | 33.6 | 0.15 | 10.42 | — | — | — | — | — | — |
| M + 0.53 vol. % F | — | — | — | 1.95 | 0.0192 | 0.034 | — | — | — |
| M + 0.35 vol. % F | — | — | — | — | — | — | 4.97 | 0.009 | 0.184/0.126 |
| M + SF | 42.7 | 0.16 | 9.7 | 0.83 | 0.088 | 0.037 | 3.94 | 0.002 | 0.67/0.32 |
| M + SF + 0.24 vol. % F | 41.0 | 0.19 | 21.14 | — | — | — | — | — | — |
| M + SF + 0.53 vol. % F | — | — | — | 1.88 | 0.0173 | 0.051 | — | — | — |
| M + SF + 0.35 vol. % F | — | — | — | — | — | — | 5.11 | 0.004 | 0.121/0.104 |

*Under compression/under tension
‡At fracture
Note:
L = latex
M = methylcellulose
SF = silica fume
F = fibers

TABLE 5

Results of simultaneous tensile testing and electrical resistivity measurement.

| | Fiber/ cement ratio | L | | | M | | | M + SF | | |
|---|---|---|---|---|---|---|---|---|---|---|
| Sample | | ΔR/R₀‡ | ρ0 (Ω · cm) | Strength (MPa) | ΔR/R₀‡ | ρ0 (Ω · cm) | Strength (MPa) | ΔR/R₀‡ | ρ0 (Ω · cm) | Strength (MPa) |
| Plain mortar | 0 | 0.88 | $1.50 \cdot 10^5$ | 0.88 | 0.88 | $1.50 \cdot 10^5$ | 0.88 | 0.88 | $1.50 \cdot 10^5$ | 0.88 |
| (+L)/(+M)/ (+M + SF) | 0 | 0.6 | $2.75 \cdot 10^5$ | 3.03 | 0.18 | $1.49 \cdot 10^5$ | 1.37 | 0.037 | $2.32 \cdot 10^5$ | 0.83 |
| +0.53 vol. % F | 0.5% | 0.053 | $9.87 \cdot 10^4$ | 3.15 | 0.034 | $2.53 \cdot 10^4$ | 1.95 | 0.051 | $2.14 \cdot 10^3$ | 1.88 |
| +1.06 vol. % F | 1.0% | 0.057 | 119 | 3.16 | 0.027 | 26.1 | 2.61 | 0.048 | 13.9 | 2.03 |
| +2.12 vol. % F | 2.0% | 0.048 | 19.7 | 3.65 | 0.033 | 16.9 | 3.05 | 0.063 | 5.02 | 2.84 |

TABLE 5-continued

Results of simultaneous tensile testing and electrical resistivity measurement.

| | Fiber/cement ratio | L | | | M | | | M + SF | | |
|---|---|---|---|---|---|---|---|---|---|---|
| Sample | | $\Delta R/R_0$‡ | $\rho 0$ ($\Omega \cdot$ cm) | Strength (MPa) | $\Delta R/R_0$‡ | $\rho 0$ ($\Omega \cdot$ cm) | Strength (MPa) | $\Delta R/R_0$‡ | $\rho 0$ ($\Omega \cdot$ cm) | Strength (MPa) |
| +3.18 vol. % F | 3.0% | 0.061 | 12.2 | 3.32 | 0.041 | 7.82 | 2.97 | 0.057 | 3.88 | 3.01 |
| +4.24 vol. % F | 4.0% | 0.047 | 7.96 | 2.92 | 0.043 | 2.84 | 2.65 | 0.055 | 3.58 | 2.49 |

‡At fracture
Note:
L = latex
M = methylcellulose
SF = silica fume
F = fibers

TABLE 6

$\Delta R/R_0$ at compressive/tensile fracture for different directions of electrical resistivity measurement and for curing at different values of the relative humidity.

| Direction of $\Delta R/R_0$ | Relative humidity during curing | Compressive* | Tensile‡ |
|---|---|---|---|
| ∥stress axis | 10% | 4.1 | 0.053 |
| ⊥stress axis | 10% | 4.3 | 0.046 |
| ∥stress axis | 60% | 4.7 | 0.061 |

*Mortar containing latex and 0.37 vol. % fibers.
‡Mortar containing latex and 0.53 vol. % fibers.

TABLE 7

Stress and strain at which the irreversible increase in $\Delta R/R_0$ starts to occur.

| | Stress (MPa) | Strain |
|---|---|---|
| Compression | | |
| L + 0.37 vol. % F | 0.03 | $1.6 \cdot 10^{-5}$ |
| M + 0.24 vol. % F | 0.35 | $2.5 \cdot 10^{-5}$ |
| M + SF + 0.24 vol. % F | 0.29 | $9.7 \cdot 10^{-5}$ |
| Tension | | |
| L + 0.53 vol. % F | 0.001 | $2 \cdot 10^{-8}$ |
| M + 0.53 vol. % F | 0.004 | $5.7 \cdot 10^{-7}$ |
| M + SF + 0.53 vol. % F | 0.063 | $2.9 \cdot 10^{-7}$ |

Note: L = latex; M = methylcellulose; SF = silica fume; F = fibers

TABLE 8

$\Delta R/R_0$ at compressive fracture and $\rho 0$ for mortars and conretes containing 0.2 vol. % carbon fibers.

| | $\Delta R/R_0$ | | $\rho 0$ ($\Omega \cdot$ cm) | |
|---|---|---|---|---|
| Dispersant | Mortar* | Concrete‡ | Mortar* | Concrete‡ |
| Methylcellulose | 10.42 | 0.37 | $8.33 \cdot 10^4$ | $3.70 \cdot 10^6$ |
| Methylcellulose + silica fume | 21.14 | 0.105 | $3.19 \cdot 10^3$ | $2.32 \cdot 10^6$ |

*0.24 vol. % carbon fibers
‡0.19 vol. % carbon fibers

TABLE 9

$\Delta R/R_0$ at compressive fracture, $\rho 0$ and compressive strength for concretes with various carbon fiber volume fractions.

| Fiber volume fraction (%) | Fiber/cement ratio | $\Delta R/R_0$ | | $\rho 0$ ($\Omega \cdot$ cm) | | Compressive strength (MPa) | |
|---|---|---|---|---|---|---|---|
| | | M | M + SF | M | M + SF | M | M + SF |
| 0.19 | 0.5% | 0.37 | 0.103 | $3.70 \cdot 10^6$ | $2.32 \cdot 10^6$ | 23.39 (±9%) | 26.90 (±8%) |
| 0.38 | 1.0% | 0.52 | 0.86 | $1.51 \cdot 10^5$ | $9.92 \cdot 10^3$ | 18.41 (±6%) | 23.53 (±7%) |
| 0.76 | 2.0% | 1.01 | 1.37 | $1.26 \cdot 10^3$ | $1.69 \cdot 10^3$ | 12.64 (±7%) | 18.84 (±9%) |
| 1.14 | 3.0% | 1.32 | 1.42 | $2.27 \cdot 10^2$ | $2.44 \cdot 10^2$ | 10.61 (±8%) | 12.30 (±7%) |

Note: M = methylcellulose; SF = silica fume

TABLE 10

Reversible and irreversible parts of $\Delta R/R_0$ relative to $\Delta R/R_0$ at fracture for mortars under compression and tension.

| | $(\Delta R/R_0)/(\Delta R/R_0)_{fracture}$ | | |
|---|---|---|---|
| | L | M | M + SF |
| Compression | | | |
| Reversible | 0.0034 (±15%) | 0.0048 (±8%) | 0.0047 (±9%) |
| Irreversible | 0.0015 (±9%) | 0.0048 (±8%) | 0.0047 (±10%) |
| Tension | | | |
| Reversible | 0.21 (±8%) | 0.29 (±12%) | 0.49 (±10%) |
| Irreversible | 0.075 (±11%) | 0.15 (±7%) | 0.059 (±15%) |

Note: L = latex; M = methylcellulose; SF = silica fume

TABLE 11

Reversible and irreversible parts of $\Delta R/R_0$ relative to $\Delta R/R_0$ at fracture for mortars and concretes under compression.

| | $(\Delta R/R_0)/(\Delta R/R_0)_{fracture}$ | |
|---|---|---|
| | M | M + SF |
| Mortars | | |
| Reversible | 0.0048 (±8%) | 0.0047 (±9%) |
| Irreversible | 0.0048 (±8%) | 0.0047 (±10%) |
| Concretes | | |
| Reversible | 0.11 (±12%) | 0.43 (±8%) |
| Irreversible | 0.11 (±15%) | 0.24 (±11%) |

Note: L = latex; M = methylcellulose; SF = silica fume

TABLE 12

Effect of stress amplitude in cyclic compressive loading on the reversible and irreversible parts of $(\Delta R/R_0)/(\Delta R/R_0)_{fracture}$ and the reversible and irreversible parts of strain/strain$_{fracture}$ for mortar containing latex and 0.37 vol. % carbon fibers.

| Maximum stress/ Fracture stress | $(\Delta R/R_0)/(\Delta R/R_0)_{fracture}$ | | Reversible/ Irreversible | strain/strain$_{fracture}$ | | Reversible/ Irreversible |
|---|---|---|---|---|---|---|
| | Reversible | Irreversible | | Reversible | Irreversible | |
| 0.75 | 0.039 | 0.244 | 0.16 | 0.29 | 0.44 | 0.66 |
| 0.65 | 0.037 | 0.102 | 0.36 | 0.29 | 0.33 | 0.88 |
| 0.50 | 0.032 | 0.115 | 0.28 | 0.38 | 0.12 | 3.17 |
| 0.40 | 0.0073 | 0.068 | 0.11 | 0.33 | 0.09 | 3.70 |
| 0.33 | 0.0034 | 0.0015 | 2.27 | 0.32 | 0.01 | 52.5 |
| 0.25 | 0.0025 | 0.0013 | 1.92 | 0.29 | 0.00 | — |
| 0.20 | 0.0027 | 0.0017 | 1.59 | 0.27 | 0.00 | — |

I claim:

1. A strain/stress sensor comprising:

a. a base material that is one of cementitious material and a concrete mixture, the base material being substantially fluid in an initial form, curing to become substantially rigid, and being a majority of a portion of an object whose strain/stress is to be monitored;

b. electrically conductive fibers dispersed throughout the base material providing a conductive path in cooperation with the base material substantially independent of contact between the fibers;

c. first and second electrical contacts on a surface of the sensor, each contact including fibers protruding from a surface of the sensor, the fibers being substantially discontinuously arranged between the first and second electrical contacts and having respective lengths substantially shorter than a distance between the first and second electrical contacts; and d. the conductive path including connections between the fibers and the base material, a variation of which results in variation in an electrical property of the strain/stress sensor and the portion of an object whose strain/stress is to be monitored between the first and second electrical contacts so that the portion of an object whose strain/stress is to be measured is its own strain/stress sensor.

2. The sensor of claim 1 wherein the base material is a cementitious material including:

a. cement; and b. methylcellulose.

3. The sensor of claim 2 wherein the methylcellulose comprises about 0.4 volume percent of the material relative to the cement.

4. The sensor of claim 2 wherein the base material further comprises silica fume.

5. The sensor of claim 4 wherein the silica fume is present in a ratio to the cement of about 0.15.

6. The sensor of claim 1 wherein the base material is a cementitious material including:

a. cement; and b. latex.

7. The sensor of claim 6 wherein the latex is present in a ratio to the cement of about 0.15.

8. The sensor of claim 1 wherein the base material comprises:

a. a concrete mixture; and b. methylcellulous.

9. The sensor of claim 8 wherein the base material further comprises silica fume.

10. The sensor of claim 1 wherein the base material is a cementitious material including:

a. a mortar mixture; and b. methylcellulose.

11. The sensor of claim 10 wherein the base material further comprises silica fume.

12. The sensor of claim 1 wherein the electrically conductive fibers comprise carbon.

13. The sensor of claim 1 wherein the electrically conductive fibers comprise steel.

14. The sensor of claim 1 in which the electrical property is an electrical resistance of the composite material that changes when stress is applied to the material.

15. The sensor of claim 14 in which the change in electrical resistance results from microcracking of the base material.

16. The sensor of claim 15 wherein the microcracking causes a change in an effective contact between the electrically conductive fibers and the base material.

17. A strain/stress sensor comprising:

an electrical conduction path between first and second surface contacts of a cured cement-matrix composite;

the cured cement-matrix composite including a cement matrix and being a major portion of an object whose strain/stress is to be measured;

electrically conductive fibers dispersed in the cement-matrix composite and forming the electrical conduction path between first and second electrical surface contacts as a result of electrical connections between the fibers and the cement matrix substantially independent of interfiber contact;

the fibers being substantially discontinuously arranged between the first and second electrical contacts and having respective lengths substantially shorter than a distance between the electrical contacts;

an electrical resistivity of the electrical conduction path changing in accordance with a strain/stress experienced by the cured cement-matrix composite; and the change in resistivity arising from a reduction in degree of the connections between the fibers and the cement-matrix.

18. The strain/stress sensor of claim 17 wherein the change in resistivity is caused by microcracking of the composite.

19. The strain/stress sensor of claim 18 wherein the applied stress induces pull-out and push-in of the electrically conductive fibers, resulting in the change of electrical resistivity of the sensor.

20. A strain/stress sensor including:

an electrically conductive base masonry material formable into a structure when in a fluid state and assuming a form of the structure when cured;

electrically conductive fibers dispersed throughout the base masonry material substantially without alignment between the fibers, the fibers being substantially more conductive than the base masonry material, the sensor having an electrical conductivity enhanced by the presence of the fibers as a result of contact between the fibers and the base masonry material; and an electrical resistance of the sensor varying with strain/stress on the base masonry material and the structure when cured as a result of microcracking in the base masonry material, the microcracking causing a reduction in the contact between the fibers and the base masonry material as strain/stress increases, the sensor thus being integral with the structure formed by the base material.

21. The sensor of claim 20 wherein the fibers are on an order of 10 microns in diameter.

22. The sensor of claim 20 wherein the fibers are on an order of 5 millimeters in length.

23. The sensor of claim 20 wherein a portion of the reduction in contact between the fibers and the base masonry material is irreversible.

24. A strain/stress sensor including:

a variable resistance electrically conductive pathway in a cured masonry material including a matrix of the cured masonry material and substantially discontinuously arranged electrically conductive fibers dispersed throughout the matrix;

the matrix being one of a concrete and a cementitious mixture;

the electrically conductive fibers being substantially shorter than a distance between two surface contacts between which the pathway extends; and a resistance of the electrically conductive pathway varying in response to strain/stress experienced by the sensor as a result of a variation in contact surface area between the electrically conductive fibers and the matrix.

25. The sensor of claim 24 wherein the variation in contact surface area arises as a result of microcracking in the matrix.

26. The sensor of claim 24 wherein a portion of an increase in resistance of the electrically conductive pathway is irreversible.

27. The sensor of claim 24 wherein the fibers have a length on an order of 5 millimeters.

28. The sensor of claim 24 wherein the fibers have a diameter on an order of 10 micrometers.

29. The sensor of claim 24 wherein the matrix is electrically conductive, the fibers being substantially more electrically conductive than the matrix.

* * * * *

UNITED STATES PATENT AND TRADEMARK OFFICE
CERTIFICATE OF CORRECTION

PATENT NO. : 5,817,944
DATED      : Oct. 6, 1998
INVENTOR(S): Deborah D. L. Chung It is certified that error appears in the above-identified patent and that said Letters Patent is hereby corrected as shown below:

On the cover page, at item [75], delete "Amhurst" and insert --Amherst--;

Signed and Sealed this

Sixth Day of April, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,817,944
DATED : Oct. 6, 1998
INVENTOR(S) : Deborah D. L. Chung

It is certified that error appears in the above-identified patent and that said Letters Patent is hereby corrected as shown below:

Title page item [73], delete "Assignees" and insert --Assignee-- and delete "; State University of New York at Buffalo, both of" and insert --,--.

Signed and Sealed this

Fourth Day of April, 2000

Attest:

Attesting Officer

Q. TODD DICKINSON

Director of Patents and Trademarks